(12) United States Patent
Szmuk et al.

(10) Patent No.: US 11,163,302 B2
(45) Date of Patent: Nov. 2, 2021

(54) AERIAL VEHICLE PROPELLERS HAVING VARIABLE FORCE-TORQUE RATIOS

(71) Applicant: Amazon Technologies, Inc., Seattle, WA (US)

(72) Inventors: Michael Szmuk, Seattle, WA (US); Christopher McFarland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 409 days.

(21) Appl. No.: 16/123,865

(22) Filed: Sep. 6, 2018

(65) Prior Publication Data
US 2020/0081432 A1    Mar. 12, 2020

(51) Int. Cl.
*B64C 11/30*    (2006.01)
*G05D 1/00*    (2006.01)
(Continued)

(52) U.S. Cl.
CPC ............ *G05D 1/0072* (2013.01); *B64C 11/20* (2013.01); *B64C 11/30* (2013.01); *B64C 11/46* (2013.01);
(Continued)

(58) Field of Classification Search
CPC ....... B64C 11/18; B64C 11/20; B64C 27/463; B64C 27/467; B64C 27/473;
(Continued)

(56) References Cited

U.S. PATENT DOCUMENTS

| 1,946,129 A | 2/1934 | Joseph |
| 2,049,832 A | 8/1936 | John |

(Continued)

FOREIGN PATENT DOCUMENTS

| CN | 103625640 A | 3/2014 |
| CN | 105620727 A | 6/2016 |

(Continued)

OTHER PUBLICATIONS

International Search Report and Written Opinion dated Dec. 3, 2019, for corresponding international application No. PCT/US2019/049421, 17 pages.

(Continued)

*Primary Examiner* — Ninh H. Nguyen
(74) *Attorney, Agent, or Firm* — Athorus, PLLC

(57) ABSTRACT

Systems and methods to improve controllability of an aerial vehicle responsive to degraded operational conditions are described. For example, one or more propeller blades of an aerial vehicle may be modifiable between two or more configurations. The configurations may include a low torque configuration suitable for normal operational conditions, and a high torque configuration suitable for degraded operational conditions. Various aspects or portions of a propeller blade may be modified to increase torque generated by the propeller blade due to drag or air resistance. The additional generated torque may then be used as a source of additional torque to improve controllability of the aerial vehicle responsive to degraded operational conditions.

12 Claims, 13 Drawing Sheets

(51) Int. Cl.
  *B64C 27/08* (2006.01)
  *B64C 27/20* (2006.01)
  *B64C 27/467* (2006.01)
  *B64C 27/52* (2006.01)
  *B64C 29/02* (2006.01)
  *B64C 39/02* (2006.01)
  *B64C 39/08* (2006.01)
  *B64D 45/04* (2006.01)
  *B64C 39/06* (2006.01)
  *B64C 11/46* (2006.01)
  *B64C 11/20* (2006.01)

(52) U.S. Cl.
  CPC .............. *B64C 27/08* (2013.01); *B64C 27/20* (2013.01); *B64C 27/467* (2013.01); *B64C 27/52* (2013.01); *B64C 29/02* (2013.01); *B64C 39/024* (2013.01); *B64C 39/062* (2013.01); *B64C 39/08* (2013.01); *B64D 45/04* (2013.01); *B64C 2201/021* (2013.01); *B64C 2201/024* (2013.01); *B64C 2201/108* (2013.01); *B64C 2201/165* (2013.01)

(58) Field of Classification Search
  CPC ..... B64C 2027/7222; B64C 2027/7266; F04D 29/024
  See application file for complete search history.

(56) References Cited

U.S. PATENT DOCUMENTS

| | | | |
|---|---|---|---|
| 2,065,343 A | 12/1936 | Moore et al. | |
| 2,071,012 A | 2/1937 | Luther | |
| 2,650,752 A | 9/1953 | Hoadley | |
| 3,092,558 A | 6/1963 | Hughes et al. | |
| 3,350,035 A | 10/1967 | Schlieben | |
| 3,559,923 A | 2/1971 | Moore | |
| 3,776,363 A | 12/1973 | Kuethe | |
| 3,853,428 A | 12/1974 | Hayden et al. | |
| 4,687,691 A | 8/1987 | Kay | |
| 4,726,548 A | 2/1988 | Clites | |
| 4,877,988 A | 10/1989 | McGinniss et al. | |
| 5,478,199 A | 12/1995 | Gliebe | |
| 5,515,444 A | 5/1996 | Burdisso et al. | |
| 5,533,865 A | 7/1996 | Dassen et al. | |
| 5,540,406 A | 7/1996 | Occhipinti | |
| 5,551,840 A | 9/1996 | Benoit et al. | |
| 5,590,849 A | 1/1997 | Pla | |
| 5,606,622 A | 2/1997 | Christenson | |
| 5,636,287 A | 6/1997 | Kubli et al. | |
| 5,668,744 A | 9/1997 | Varadan et al. | |
| 5,755,408 A | 5/1998 | Schmidt et al. | |
| 5,785,282 A | 7/1998 | Wake et al. | |
| 5,961,067 A | 10/1999 | Hall et al. | |
| 6,140,730 A | 10/2000 | Tkaczyk et al. | |
| 6,161,800 A | 12/2000 | Liu et al. | |
| 6,201,872 B1 | 3/2001 | Hersh et al. | |
| 6,270,038 B1 | 8/2001 | Cycon et al. | |
| 6,358,013 B1 | 3/2002 | Rose et al. | |
| 6,368,059 B1 | 4/2002 | Maines | |
| 6,467,732 B2 * | 10/2002 | Tsukahara | B64C 27/463 244/17.11 |
| 6,654,467 B1 | 11/2003 | York et al. | |
| 6,671,590 B1 | 12/2003 | Betzina et al. | |
| 7,360,996 B2 | 4/2008 | Driver | |
| 7,413,408 B1 | 8/2008 | Tafoya | |
| 7,604,461 B2 | 10/2009 | Bonnet | |
| 7,693,292 B1 | 4/2010 | Gross et al. | |
| 7,757,992 B2 * | 7/2010 | Bussom | B64C 27/463 244/17.25 |
| 7,878,457 B2 | 2/2011 | Narramore | |
| 8,047,801 B2 | 11/2011 | Fang et al. | |
| 8,210,482 B2 | 7/2012 | Miller et al. | |
| 8,414,261 B2 | 4/2013 | Bonnet | |
| 8,425,191 B2 | 4/2013 | Ali | |
| 8,444,092 B2 | 5/2013 | Li et al. | |
| 8,523,515 B2 | 9/2013 | Drobietz et al. | |
| 8,535,008 B2 | 9/2013 | Dewar et al. | |
| 8,742,641 B2 | 6/2014 | Kubes et al. | |
| 8,855,329 B2 | 10/2014 | Slapak et al. | |
| 8,870,124 B2 | 10/2014 | Ireland | |
| 9,404,642 B2 * | 8/2016 | Chen | G09F 13/22 |
| 9,464,532 B2 * | 10/2016 | Sutton | F01D 7/00 |
| 9,573,674 B1 | 2/2017 | Pingree | |
| 9,752,559 B2 | 9/2017 | Herr et al. | |
| 2003/0219132 A1 | 11/2003 | Sommerfeldt et al. | |
| 2005/0163963 A1 | 7/2005 | Munro et al. | |
| 2006/0060721 A1 | 3/2006 | Watts et al. | |
| 2006/0138777 A1 | 6/2006 | Hofbauer et al. | |
| 2006/0263223 A1 | 11/2006 | Gustafson et al. | |
| 2007/0023581 A1 | 2/2007 | La | |
| 2008/0080977 A1 | 4/2008 | Bonnet | |
| 2008/0166241 A1 | 7/2008 | Herr et al. | |
| 2008/0217485 A1 | 9/2008 | Ikeda | |
| 2008/0243313 A1 | 10/2008 | Schaeffer | |
| 2008/0286110 A1 | 11/2008 | Gupta et al. | |
| 2009/0043431 A1 | 2/2009 | Marze | |
| 2009/0268556 A1 | 10/2009 | Jiang et al. | |
| 2010/0266416 A1 | 10/2010 | Marshall et al. | |
| 2010/0329879 A1 | 12/2010 | Presz, Jr. et al. | |
| 2011/0015034 A1 | 1/2011 | Ehinger et al. | |
| 2011/0041494 A1 | 2/2011 | Parker et al. | |
| 2011/0042509 A1 | 2/2011 | Bevirt et al. | |
| 2011/0142628 A1 | 6/2011 | Xiong | |
| 2011/0223030 A1 | 9/2011 | Huck et al. | |
| 2011/0229321 A1 | 9/2011 | Kilaras | |
| 2011/0260008 A1 | 10/2011 | Smith | |
| 2011/0262705 A1 | 10/2011 | Gupta et al. | |
| 2014/0064960 A1 | 3/2014 | Schenk et al. | |
| 2014/0142888 A1 | 5/2014 | Duncan et al. | |
| 2014/0186188 A1 | 7/2014 | Takeuchi | |
| 2014/0248148 A1 | 9/2014 | Abdallah et al. | |
| 2014/0255184 A1 | 9/2014 | Sutton | |
| 2014/0312166 A1 | 10/2014 | Zhu | |
| 2015/0050154 A1 | 2/2015 | Dixon et al. | |
| 2016/0131108 A1 | 5/2016 | Shimura et al. | |
| 2016/0298600 A1 | 10/2016 | Tian et al. | |
| 2017/0276117 A1 | 9/2017 | Church | |
| 2018/0105257 A1 * | 4/2018 | Bernhardt | B64C 3/30 |

FOREIGN PATENT DOCUMENTS

| | | | | |
|---|---|---|---|---|
| DE | 102009033821 A1 | 1/2011 | | |
| DE | 202011106150 U1 | 1/2012 | | |
| EP | 1775214 A1 | 4/2007 | | |
| EP | 2535269 A1 * | 12/2012 | ........... | B64C 27/615 |
| EP | 2774843 A1 | 9/2014 | | |
| EP | 2675705 B1 | 1/2017 | | |
| GB | 2462452 B | 2/2011 | | |
| JP | H07300098 A | 11/1995 | | |
| JP | 2001301696 A | 10/2001 | | |
| JP | 2007530361 A | 11/2007 | | |
| WO | 2001030652 A1 | 5/2001 | | |
| WO | 2008043874 A1 | 4/2008 | | |
| WO | 2010015866 A2 | 2/2010 | | |
| WO | 2010028653 A3 | 9/2010 | | |
| WO | 2012110267 A1 | 8/2012 | | |
| WO | 2015150529 A1 | 10/2015 | | |
| WO | 2017106376 A1 | 6/2017 | | |

OTHER PUBLICATIONS

Andrew Rosenblum et al, "The Jets of the Future," May 1, 2012, Retrieved from the Internet on Mar. 27, 2018: URL: https://www.popsci.com/technology/article/2012-04/jets-future, pp. 1-9.

Dirtflare, "Ring Wing VTOL!!!," Specifications Ring Wing VTOL!!!, Aug. 1, 2016, Retrieved from the Internet on Mar. 22, 2018: URL: https://www.simpleplanes.com/a/Mo2vSy/Ring-Wing-VTOL, pp. 1-2.

Du, Guang-Xun; Quan, Quan; and Cai, Kai-Yuan; "Controllability Analysis and Degraded Control for a Class of Hexacopters Subject to Rotor Failures," JIRS, 2014.

(56) References Cited

OTHER PUBLICATIONS

Giribet, Juan I.; Sanchez-Pena, Ricardo S.; and Ghersin, Alejandro; "Analysis and Design of a Tilted Rotor Hexacopter for Fault Tolerance," IEEE TAES, 2016.

Michieletto, Giulia; Ryll, Markus; Franchi, Antonio; "Control of Statically Hoverable Multi-Rotor Aerial Vehicles and Application to Rotor-Failure Robustness for Hexarotors," IEEE ICRA, 2017.

* cited by examiner

AERIAL VEHICLE PROPELLERS HAVING VARIABLE FORCE-TORQUE RATIOS

CROSS-REFERENCE TO RELATED APPLICATION

This application is related to U.S. application Ser. No. 15/435,121, filed Feb. 16, 2017, entitled "Six Degree of Freedom Aerial Vehicle with a Ring Wing," which is incorporated herein by reference in its entirety.

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. Likewise, unmanned ground based units are often used in materials handling facilities to autonomously transport inventory within the facility. While there are many beneficial uses of these vehicles, balancing the tightly coupled vehicle performance parameters of stability, maneuverability, and energy efficiency introduces design complexities of the UAVs. For example, due to current design limitations, design tradeoffs exist between optimizing UAVs for high agility versus high energy efficiency. Likewise, aerial vehicles are designed to only operate with four degrees of freedom—pitch, yaw, roll, and heave. In addition, aerial vehicles are generally designed assuming a fully operational state. Accordingly, there is a need for systems and methods to maintain control and safety of aerial vehicles even in degraded operational states.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
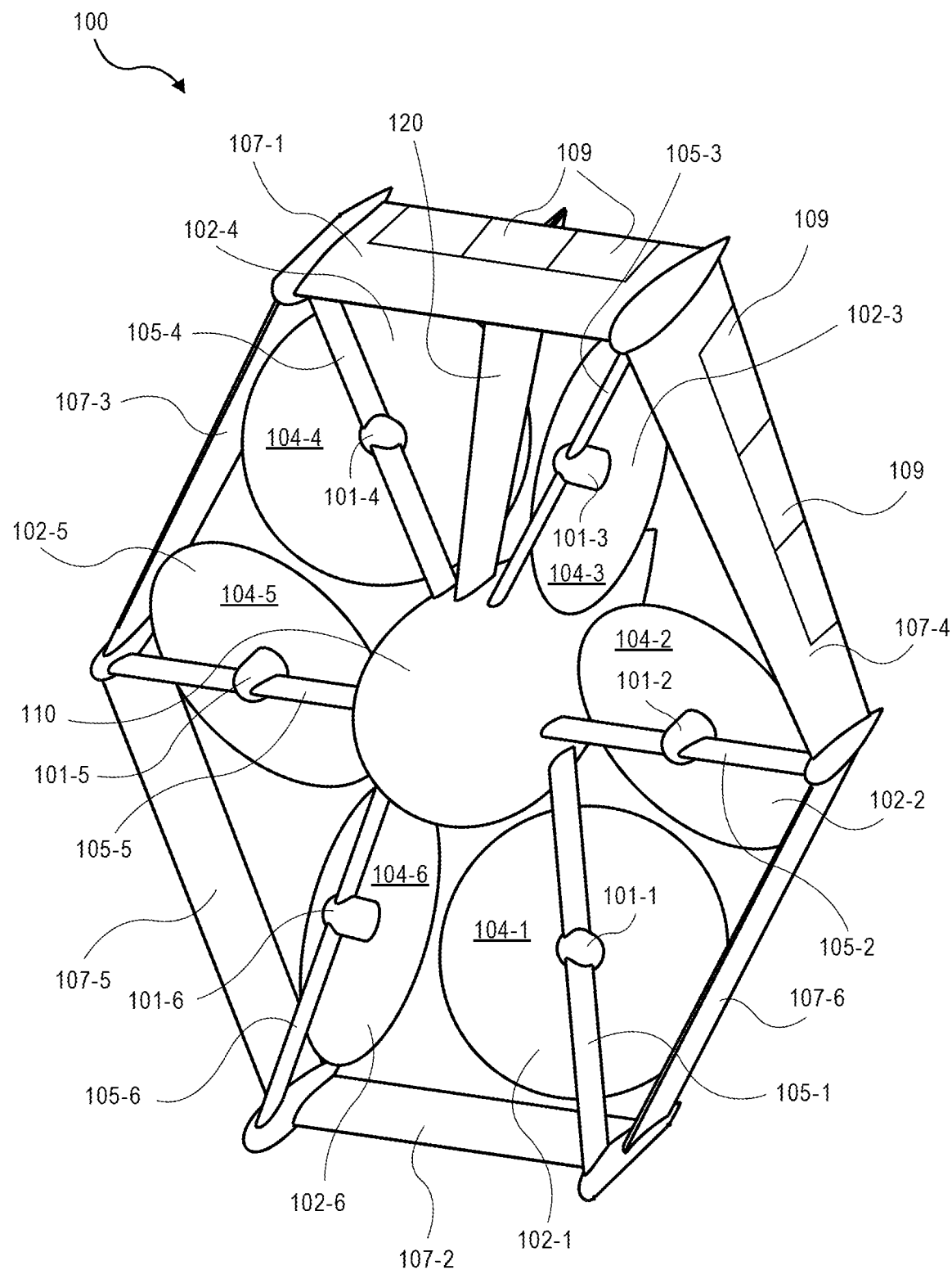
FIGS. 1-4 illustrate various views of an aerial vehicle with a substantially hexagonal shaped ring wing, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes aerial vehicles, such as UAVs (e.g., quad-copters, hex-copters, hepta-copters, octa-copters) that can operate in a vertical takeoff and landing (VTOL) orientation or in a horizontal flight orientation. Likewise, when the aerial vehicle is in a VTOL orientation, it can transition independently in any of the six degrees of freedom. Specifically, as described herein, the aerial vehicles may efficiently rotate in any of the three degrees of freedom of rotation (pitch, yaw, and roll) and/or may efficiently move in any of the three degrees of freedom of translation (surge, heave, and sway). For example, the aerial vehicle may include six propulsion mechanisms that are oriented at different angles and therefore, together, can provide thrust in the vertical direction and/or the horizontal direction when the aerial vehicle is in a VTOL orientation.

As discussed further below, a ring wing is included on the aerial vehicle that surrounds the propulsion mechanisms of the aerial vehicle and provides both protection around the propulsion mechanisms and lift when the aerial vehicle is in the horizontal flight orientation and navigating in a substantially horizontal direction.

In addition, responsive to degraded functional states of aerial vehicles such as motor out situations, the aerial vehicles described herein may implement one or more reconfigurations to maintain control of the aerial vehicles and land the aerial vehicles at safe landing locations. In example embodiments, an aerial vehicle that has detected a failed propulsion mechanism may modify force-torque ratios of one or more propellers or propeller blades of one or more remaining propulsion mechanisms. In various example embodiments, a force-torque ratio of a propeller or propeller blade may be reduced by increasing the torque generated by a propeller or propeller blade, while also substantially maintaining the force, lift, or thrust generated by the propeller or propeller blade during operation. As described herein, the torque generated by the propeller or propeller blade may correspond to, may be related to, and/or may be the result of drag or air resistance experienced by the propeller or propeller blade during operation.

Generally, when an aerial vehicle such as a hex-copter is in a degraded operational states such as a motor out situation, the aerial vehicle may no longer be able to maintain control over all six degrees of freedom and instead may only maintain effective control over five or fewer degrees of freedom. For example, in degraded operational states of aerial vehicles, available torque in one or more directions may be deficient, unbalanced, or asymmetrical, and in extreme cases, no torque may be available in one or more directions. By modifying force-torque ratios of one or more propellers or propeller blades, e.g., increasing torque generated by one or more propellers or propeller blades, and/or by altering angular orientations of one or more propulsion mechanisms, in response to degraded operational states of aerial vehicles such as motor out situations, the aerial vehicles described herein may utilize the additionally generated torque to improve or increase controllability of the aerial vehicles. For example, the increased torque generated by one or more reconfigured propellers or propeller blades may function as a source of additional torque that can be initiated, modified, and/or controlled to substantially improve or increase controllability of an aerial vehicle by improving or restoring available torque in one or more directions of deficient torque to relatively more balanced or symmetrical levels.

In example embodiments, one or more modifiable sections of a propeller or propeller blade may be deployed, extended, rotated, expanded, or otherwise adjusted or modified between two or more configurations to modify force-torque ratios of a propeller or propeller blade. In some example embodiments, in order to modify force-torque ratios of a propeller or propeller blade, one or more flaps or protrusions may be deployed or extended from an underside of a propeller blade to increase drag or air resistance. In other example embodiments, in order to modify force-torque ratios of a propeller or propeller blade, one or more sections or portions of a propeller blade may be rotated to increase drag or air resistance. In further example embodiments, in order to modify force-torque ratios of a propeller or propeller blade, one or more sections or portions of a propeller blade may be modified or expanded to increase drag or air resistance. In still further example embodiments, various combinations of reconfigurations described herein may be implemented.

Moreover, although aerial vehicle reconfigurations of one or more modifiable sections of propeller blades are described herein generally in the context of degraded functional or operational states of aerial vehicles, in some example embodiments, various of the aerial vehicle reconfigurations may be performed even in fully functional states or other operational states of aerial vehicles. In this manner, the force-torque ratios of one or more propeller blades may be modified as described herein to improve or increase controllability of aerial vehicles even in the absence of any particular faults or failures of one or more components of aerial vehicles.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using an aerial vehicle. For example, an item carried by a payload of an aerial vehicle discussed herein may be ordered by a customer of an electronic commerce website and aerially delivered by the aerial vehicle to a delivery location.

FIG. 1 illustrates a view of an aerial vehicle 100 with a ring wing that is substantially hexagonal in shape and that surrounds a plurality of propulsion mechanisms, according to disclosed implementations. The aerial vehicle 100 includes six propulsion mechanisms 102-1, 102-2, 102-3, 102-4, 102-5, and 102-6 spaced about the fuselage 110 of the aerial vehicle 100. As discussed above, while the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween). In addition, the terms propeller and propeller blade are used herein substantially interchangeably with reference to the disclosed implementations, with the understanding that a propeller may comprise one or more propeller blades.

Likewise, while the examples herein describe the propulsion mechanisms being able to generate force in either direction, in some implementations, the propulsion mechanisms may only generate force in a single direction. However, the orientation of the propulsion mechanisms may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the motor arm extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, plastics, metals, aluminum, steel, other materials, or combinations thereof.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1.

The angle of orientation of each of the propulsion mechanism 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
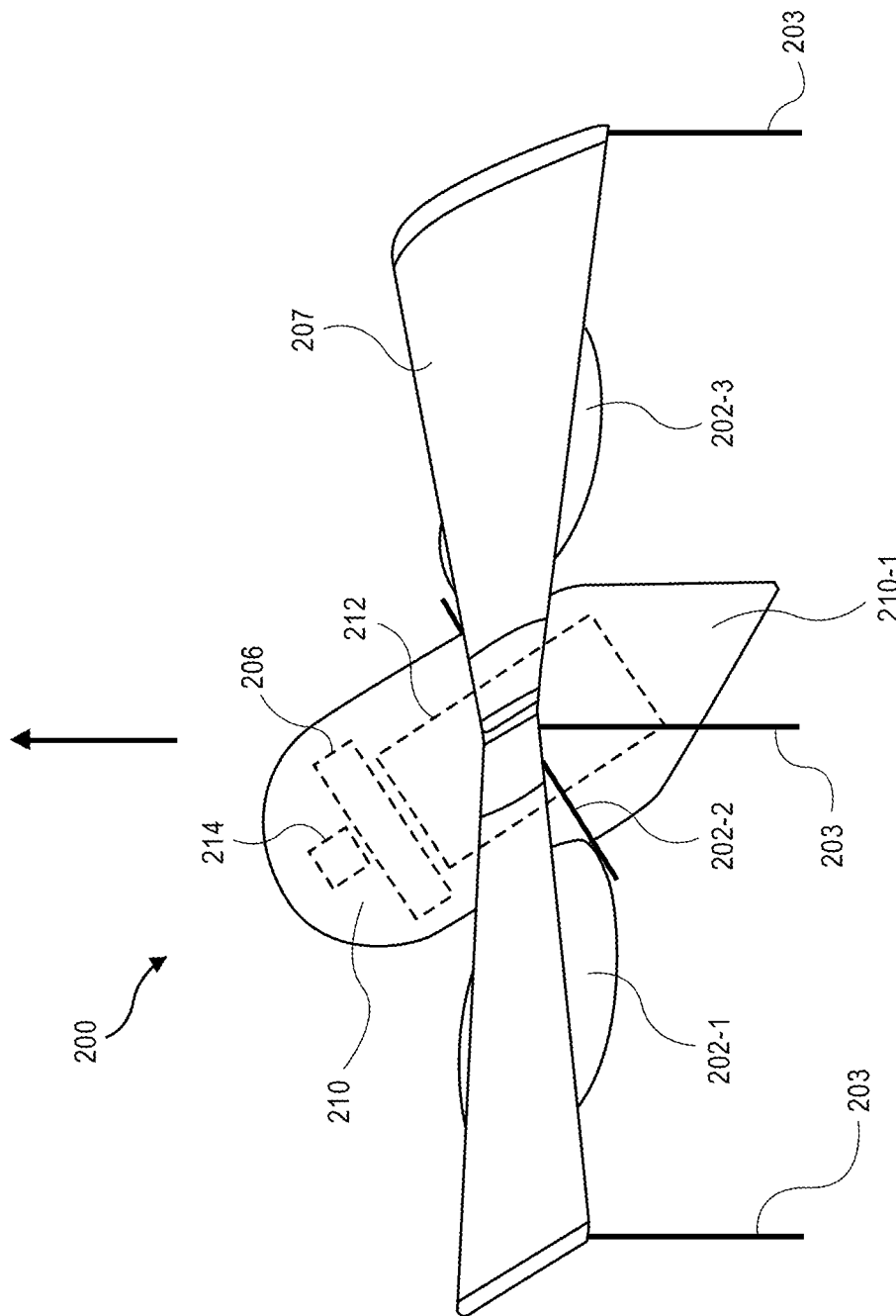

FIG. 2 illustrates a side view of the aerial vehicle 200 oriented for vertical takeoff and landing (VTOL), in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the aerial vehicle, such as the aerial vehicle control system 214, a power module 206, and/or a payload 212 that is transported by the aerial vehicle. The aerial vehicle control system 214 is discussed further below. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, and the payload engagement module 210-1.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer specified delivery location using the aerial vehicle 200.

In some implementations, the fuselage 210 may include a payload engagement module 210-1. For example, the payload engagement module 210-1 may be a hinged portion of the fuselage 210 that can rotate between an open position, in which the interior of the fuselage is accessible so that the payload 212 may be added to or removed from the fuselage, and a closed position, as illustrated in FIG. 2, so that the payload 212 is secured within the interior of the fuselage.

Figure 3:
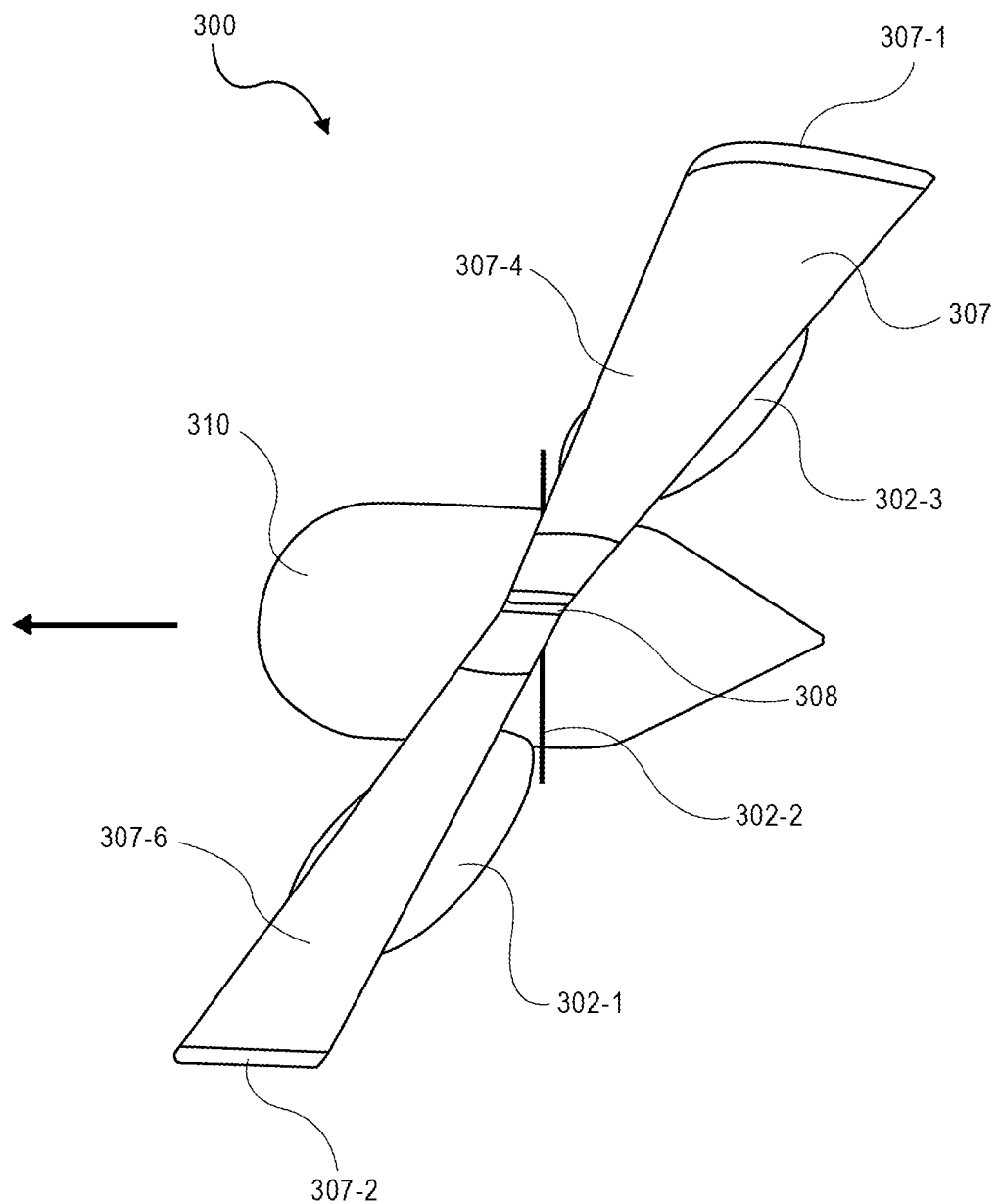

FIG. 3 is a side view of an aerial vehicle 300 with a ring wing 307, in accordance with disclosed implementations. The aerial vehicle 300 corresponds to the aerial vehicle 100 discussed in FIG. 1 and aerial vehicle 200 discussed in FIG. 2. As illustrated, when the aerial vehicle is oriented for horizontal flight, as illustrated in FIG. 3, the fuselage 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, are not oriented to produce forces in substantially the horizontal direction. During horizontal flight, the propulsion mechanisms, such as propulsion mechanism 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 300.

The ring wing 307 is angled such that the lower segment 307-2 of the ring wing is positioned ahead of the upper segment 307-1 of the ring wing 307. The leading wing, lower segment 307-2 produces a much higher lift per square inch than the rear wing, upper segment 307-1, and the chord length of the lower segment 307-2 is less than the chord length of the upper segment 307-1. Likewise, as illustrated, the upper segment 307-1 of the ring wing has a different camber than the lower segment 307-2. The chord length and camber transition from that illustrated along the upper segment 307-1 to the lower segment 307-2. In implementations that include one or more stabilizer fins, such as stabilizer fin 120 (FIG. 1), the difference between the chord lengths of the lower segment 307-2 and the upper segment 307-1 may be less and/or the difference between the cambers of the lower segment 307-2 and the upper segment 307-1 may be less.

While the side segments, such as side segment 307-4 and segment 307-6 of the ring wing provide some lift, at the midpoint 308 of each side segment there is minimal lift produced by the ring wing 307. Because there is minimal lift produced at the midpoint 308, the segments may be tapered to reduce the overall weight of the aerial vehicle. In this example, the side segments, such as side segments 307-4 and 307-6, are tapered toward the mid-point but retain some dimension for structural integrity and to operate as a protective barrier around the propulsion mechanisms 302. While the illustrated examples show both side segments 307-4 and 307-6 tapering to a smaller end at the midpoint 308, in other implementations, the taper may be consistent from the larger top segment 307-1 to the smaller lower segment 307-2.

In addition to providing lift, the ring wing 307 provides a protective barrier or shroud that surrounds the propulsion mechanisms of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

Figure 4:
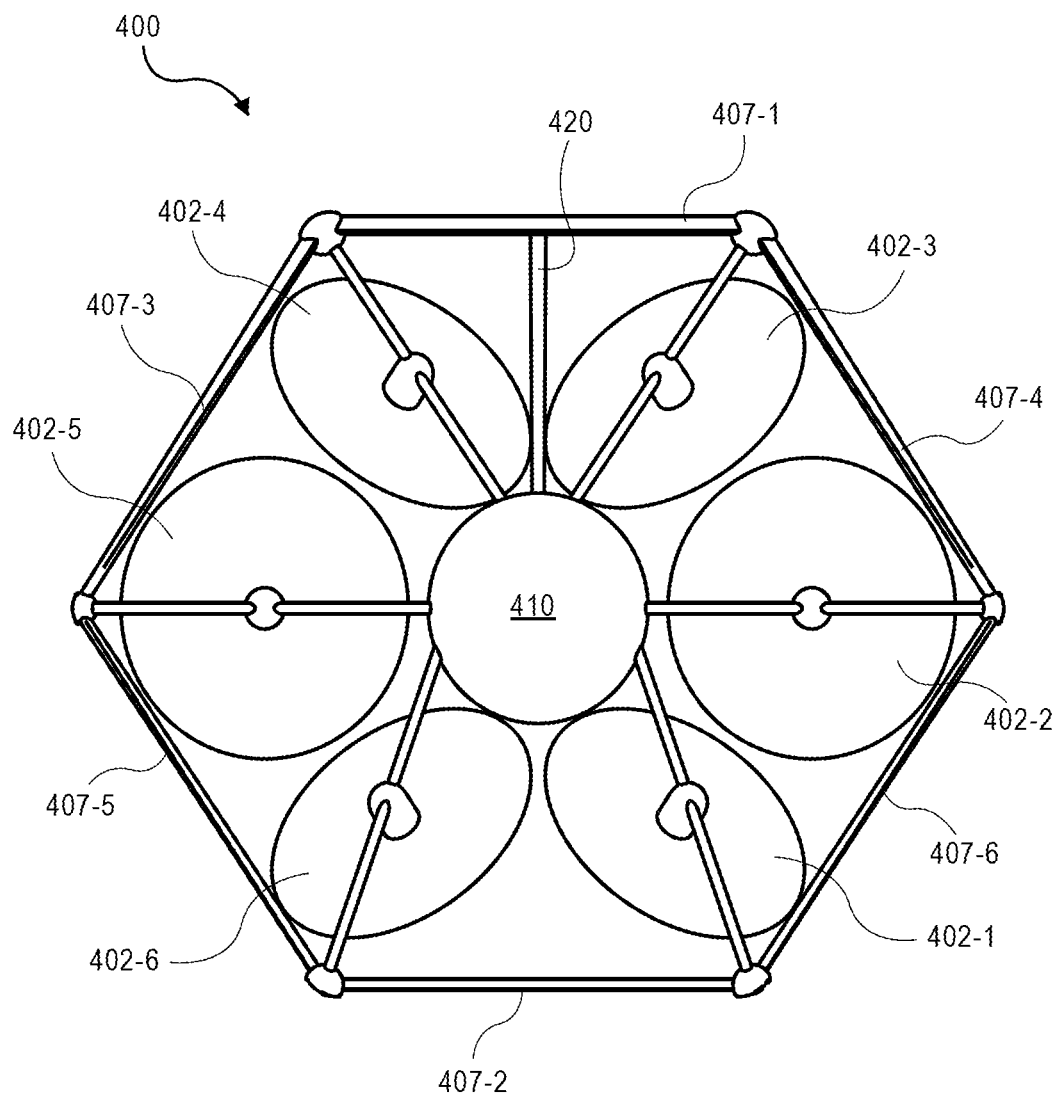

FIG. 4 is a front-on view of an aerial vehicle 400 with a ring wing 407 having a substantially hexagonal shape, according to disclosed implementations. The aerial vehicle 400 corresponds to aerial vehicle 100 of FIG. 1, aerial vehicle 200 of FIG. 2, and aerial vehicle 300 of FIG. 3. As discussed above with respect to FIG. 3, when the aerial vehicle is oriented for horizontal flight, as illustrated in FIGS. 3 and 4, the fuselage 410 is oriented in the direction of travel, the ring wing 407 is oriented in the direction of travel such that it will produce a lifting force, and propulsion mechanisms 402-2 and 402-5, which are on opposing sides of the fuselage 410, are aligned to produce forces in the substantially horizontal direction to propel or thrust the aerial vehicle horizontally. The other propulsion mechanisms 402-1, 402-3, 402-4, and 402-6 are offset and may be disabled, used to produce maneuverability forces, and/or allowed to freely rotate and produce energy that is used to charge a power module of the aerial vehicle 400. By increasing the thrust produced by each of the propulsion mechanisms 402-2 and 402-5, the horizontal speed of the aerial vehicle increases. Likewise, the lifting force from the ring wing 407 also increases. In some implementations, one or more ailerons, such as those discussed above with respect to FIG. 1, may be included on the surface of the ring wing and used to control the aerial navigation of the aerial vehicle during horizontal flight. Likewise, one or more stabilizer fins 420 may be included to stabilize the aerial vehicle during horizontal flight.

Figure 5:
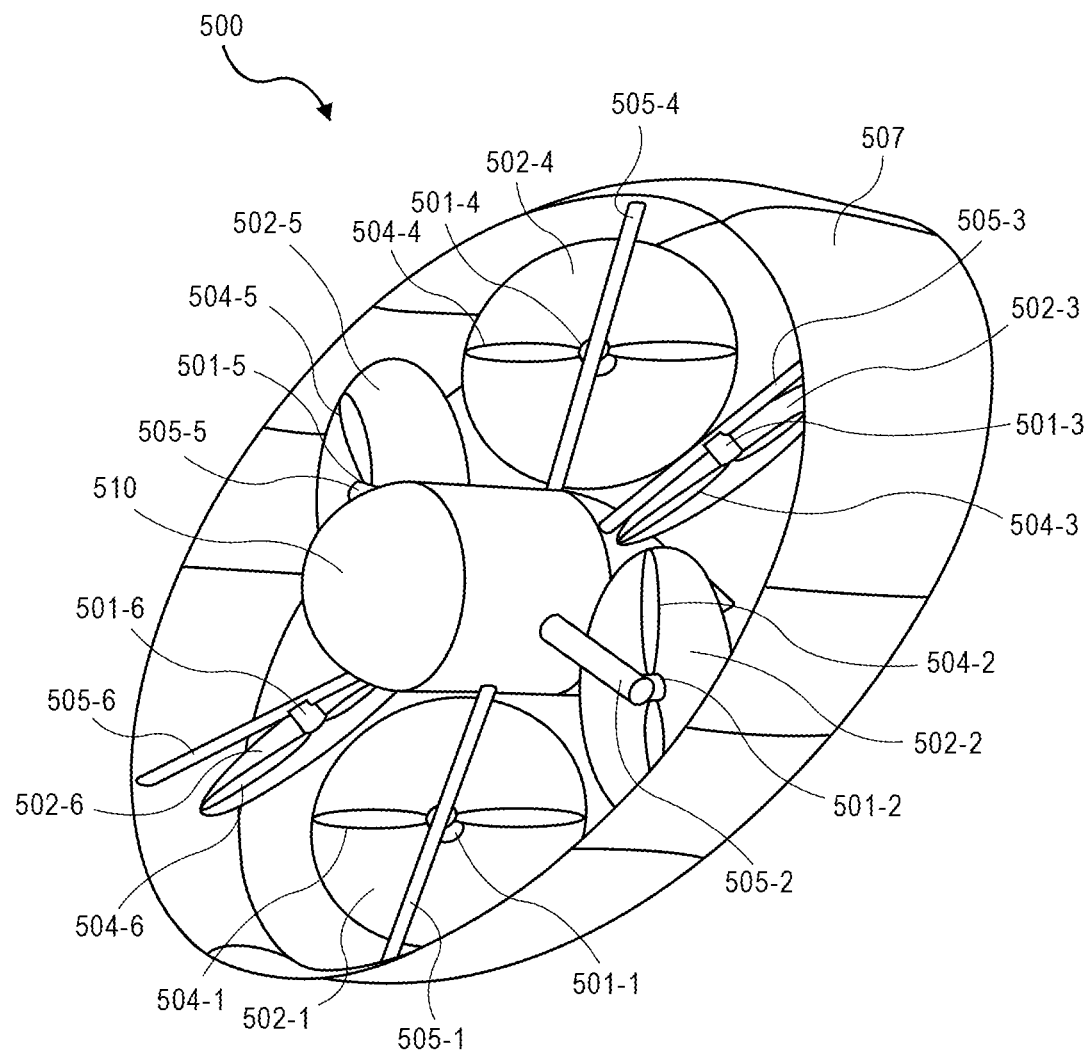
FIG. 5 illustrates a view of an aerial vehicle with a substantially circular shaped ring wing, in accordance with disclosed implementations.

In some implementations, the hexagonal shaped ring wing may decrease manufacturing costs, provide for more stable flight, and provide flatter surfaces upon which control elements, such as ailerons, may be included, in comparison to a substantially circular shaped ring wing as described herein with respect to FIG. 5. Likewise, other components may be coupled to the surface of the ring wing. Other components include, but are not limited to, sensors, imaging elements, range finders, identifying markers, navigation components, such as global positioning satellite antennas, antennas, etc.

As discussed below, to transition the aerial vehicle from a VTOL orientation, as illustrated in FIG. 2, to a horizontal flight orientation, as illustrated in FIGS. 3 and 4, forces generated by each of the propulsion mechanisms 402 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 402 are utilized to maintain flight of the aerial vehicle 400.

As illustrated in FIGS. 1-4, each of the propulsion mechanisms 402 are positioned in approximately the same plane that is substantially aligned with the ring wing. Likewise, each propulsion mechanism 402 is spaced approximately sixty degrees from each other around the fuselage 410, such that the propulsion mechanisms are positioned at approximately equal distances with respect to one another and around the fuselage 410 of the aerial vehicle 400. For example, the second propulsion mechanism 402-2 and the fifth propulsion mechanism 402-5 may each be positioned along the X axis. The third propulsion mechanism 402-3 may be positioned at approximately sixty degrees from the X axis and the fourth propulsion mechanism 402-4 may be positioned approximately one-hundred and twenty degrees from the X axis. Likewise, the first propulsion mechanism 402-1 and the sixth propulsion mechanism 402-6 may likewise be positioned approximately sixty and one-hundred and twenty degrees from the X axis in the negative direction.

In other implementations, the spacing between the propulsion mechanisms may be different. For example, propulsion mechanisms 402-1, 402-3, and 402-5, which are oriented in the first direction, may each be approximately equally spaced 120 degrees apart and propulsion mechanisms 402-2, 402-4, and 402-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 402-1, 402-3, and 402-5, oriented in the first direction, may be positioned at approximately zero degrees, approximately 120 degrees, and approximately 240 degrees around the perimeter of the aerial vehicle with respect to the X axis, and the propulsion mechanisms 402-2, 402-4, and 402-6, oriented in the second direction, may be positioned at approximately 10 degrees, approximately 130 degrees, and approximately 250 degrees around the perimeter of the aerial vehicle 400 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-4 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 402-1, 402-3, and 402-5 may each be oriented approximately fifteen degrees in the first direction and propulsion mechanisms 402-2, 402-4, and 402-6 may be oriented approximately twenty-five degrees in the second direction. In still other examples, pairs of propulsion mechanisms may have different orientations than other pairs of propulsion mechanisms. For example, propulsion mechanisms 402-1 and 402-6 may each be oriented approximately thirty degrees in the first direction and second direction, respectively, toward one another, propulsion mechanisms 402-3 and 402-2 may each be oriented approximately forty-five degrees in the first direction and second direction, respectively, toward one another, and propulsion mechanisms 402-5 and 402-4 may each be oriented approximately forty-five degrees in the first direction and second direction, respectively, toward one another.

As discussed below, by orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, as discussed below, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 402 enables the aerial vehicle 400 to operate independently in any of the six degrees of freedom (surge, sway, heave, pitch, yaw, and roll). As a result, the stability and maneuverability of the aerial vehicle 400 is increased.

While the implementations illustrated in FIGS. 1-4 include six arms that extend radially from a central portion of the aerial vehicle and are coupled to the ring wing, in other implementations, there may be fewer or additional arms. For example, the aerial vehicle may include support arms that extend between the motor arms and provide additional support to the aerial vehicle. As another example, not all of the motor arms may extend to and couple with the ring wing.

FIG. 5 illustrates a view of an aerial vehicle 500 with a ring wing that is substantially cylindrical or circular in shape and that surrounds a plurality of propulsion mechanisms, in accordance with disclosed implementations. The aerial vehicle 500 includes six motors 501-1, 501-2, 501-3, 501-4, 501-5, and 501-6 and corresponding propellers 504-1, 504-2, 504-3, 504-4, 504-5, and 504-6 spaced about the fuselage 510 of the aerial vehicle 500. The propellers 504 may be any form of propeller (e.g., graphite, carbon fiber) and of any size. For example, the propellers may be 10 inch-12-inch diameter carbon fiber propellers.

The form and/or size of some of the propellers may be different than other propellers. Likewise, the motors 501 may be any form of motor, such as a DC brushless motor, and may be of a size sufficient to rotate the corresponding propeller. Likewise, in some implementations, the size and/or type of some of the motors 501 may be different than other motors 501. In some implementations, the motors may be rotated in either direction such that the force generated by the propellers may be either a positive force, when rotating in a first direction, or a negative force, when rotating in the second direction. Alternatively, or in addition thereto, the pitch of the blades of a propeller may be variable. By varying the pitch of the blades, the force generated by the propeller may be altered to either be in a positive direction or a negative direction. Still further, in some implementations, the pitch of the blades may be adjusted such that they are aligned with the direction of travel of the aerial vehicle and thus provide significantly less drag if they are not rotating.

Each pair of motors 501 and corresponding propellers 504 will be referred to herein collectively as a propulsion mechanism 502, such as propulsion mechanisms 502-1, 502-2, 502-3, 502-4, 502-5, and 502-6. Likewise, while the example illustrated in FIG. 5 describes the propulsion mechanisms 502 as including motors 501 and propellers 504, in other implementations, other forms of propulsion may be utilized as the propulsion mechanisms 502. For example, one or more of the propulsion mechanisms 502 of the aerial vehicle 500 may utilize fans, jets, turbojets, turbo fans, jet engines, and/or the like to maneuver the aerial vehicle. Generally described, a propulsion mechanism 502, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 502-1, 502-2, 502-3, 502-4, 502-5, and 502-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

The aerial vehicle 500 also includes a ring wing 507 having a substantially cylindrical or circular shape that extends around and forms the perimeter of the aerial vehicle 500. In the illustrated example, the ring wing is substantially circular in shape and tapers toward the bottom of the aerial vehicle. The ring wing 507 has an airfoil shape to produce lift when the aerial vehicle is oriented as illustrated in FIG. 5 and moving in a direction that is substantially horizontal. As illustrated, and discussed further below, the ring wing is positioned at an angle with respect to the fuselage 510 such that the lower part of the ring wing acts as a front wing as it is positioned toward the front of the aerial vehicle when oriented as shown and moving in a horizontal direction. The top of the ring wing, which has a longer chord length than the bottom portion of the ring wing 507, is positioned farther back and thus acts as a rear wing.

The ring wing is secured to the fuselage 510 by motor arms 505. In the illustrated example, each of motors arms 505-1, 505-3, 505-4, and 505-6 are coupled to the fuselage 510 at one end, extend from the fuselage 510 and couple to the ring wing 507 at a second end, thereby securing the ring wing 507 to the fuselage 510.

The fuselage 510, motor arms 505, and ring wing 507 of the aerial vehicle 500 may be formed of any one or more suitable materials, such as graphite, carbon fiber, plastics, metals, aluminum, steel, other materials, or combinations thereof.

Each of the propulsion mechanisms 502 are coupled to a respective motor arm 505 (or propulsion mechanism arm) such that the propulsion mechanism 502 is substantially contained within the perimeter of the ring wing 507. For example, propulsion mechanism 502-1 is coupled to motor arm 505-1, propulsion mechanism 502-2 is coupled to motor arm 505-2, propulsion mechanism 502-3 is coupled to motor arm 505-3, propulsion mechanism 502-4 is coupled to motor arm 505-4, propulsion mechanism 502-5 is coupled to motor arm 505-5, and propulsion mechanism 502-6 is coupled to motor arm 505-6. In the illustrated example, propulsion mechanisms 502-1, 502-3, 502-4, and 502-6 are coupled at an approximate mid-point of the respective motor arm 505 between the fuselage 510 and the ring wing 507. In other implementations, the propulsion mechanisms (such as propulsion mechanisms 502-2 and 502-5 illustrated in FIG. 5) may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 510 or closer toward the ring wing 507).

As illustrated, the propulsion mechanisms 502 may be oriented at different angles with respect to each other. For example, propulsion mechanisms 502-2 and 502-5 are aligned with the fuselage 510 such that the force generated by each of propulsion mechanisms 502-2 and 502-5 is in-line or in the same direction or orientation as the fuselage. In the illustrated example, the aerial vehicle 500 is oriented for horizontal flight such that the fuselage is oriented horizontally in the direction of travel. In such an orientation, the propulsion mechanisms 502-2 and 502-5 provide horizontal forces, also referred to herein as thrusting forces, and act as thrusting propulsion mechanisms.

In comparison to propulsion mechanisms 502-2 and 502-5, each of propulsion mechanisms 502-1, 502-3, 502-4, and 502-6 are offset or angled with respect to the orientation of the fuselage 510. When the aerial vehicle 500 is oriented horizontally as shown in FIG. 5 for horizontal flight, the propulsion mechanisms 502-1, 502-3, 502-4, and 502-6 may be used as propulsion mechanisms, providing thrust in a non-horizontal direction to cause the aerial vehicle to pitch, yaw, roll, heave and/or sway. In other implementations, during horizontal flight, the propulsion mechanisms 502-1, 502-3, 502-4, and 502-6 may be disabled such that they do not produce any forces and the aerial vehicle 500 may be propelled aerially in a horizontal direction as a result of the lifting force from the aerodynamic shape of the ring wing 507 and the horizontal thrust produced by the thrusting propulsion mechanisms 502-2 and 502-5.

The angle of orientation of each of the propulsion mechanisms 502-1, 502-3, 502-4, and 502-6 may vary for different implementations. Likewise, in some implementations, the offset of the propulsion mechanisms 502-1, 502-3, 502-4, and 502-6 may each be the same, with some oriented in one direction and some oriented in another direction, may each be oriented different amounts, and/or in different directions.

In the illustrated example of FIG. 5, each propulsion mechanism 502-1, 502-2, 502-3, 502-4, 502-5, and 502-6 may be oriented approximately thirty degrees with respect to the position of each respective motor arm 505-1, 505-2, 505-3, 505-4, 505-5, and 505-6. In addition, the direction of orientation of the propulsion mechanisms is such that pairs of propulsion mechanisms are oriented toward one another. For example, propulsion mechanism 502-1 is oriented approximately thirty degrees toward propulsion mechanism 502-6. Likewise, propulsion mechanism 502-2 is oriented approximately thirty degrees in a second direction about the second motor arm 505-2 and oriented toward propulsion mechanism 502-3. Finally, propulsion mechanism 502-4 is oriented approximately thirty degrees in the first direction about the fourth motor arm 505-4 and toward propulsion mechanism 502-5. As illustrated, propulsion mechanisms 502-2 and 502-5, which are on opposing sides of the fuselage 110, are aligned and oriented in a same first direction (in this example, horizontal). Propulsion mechanisms 502-3 and 502-6, which are on opposing sides of the fuselage 510, are aligned and oriented in a same second direction, which is angled compared to the first direction. Propulsion mechanisms 502-1 and 502-4, which are on opposing sides of the fuselage 510, are aligned and oriented in a same third direction, which is angled compared to the first direction and the second direction.

Various other features, variations, modifications, and/or example embodiments described herein with respect to FIGS. 1-4 may also be combined and/or incorporated into the aerial vehicle 500 as illustrated in FIG. 5.

While the examples discussed above in FIGS. 1-5 describe a ring wing in either a substantially hexagonal shape (FIGS. 1-4) or a substantially circular shape (FIG. 5), in other implementations, the ring wing may have other shapes. For example, the ring wing may be substantially square, rectangular, pentagonal, octagonal, etc.

During operation of example aerial vehicles, such as those illustrated and described with respect to FIGS. 1-5, various types of faults or failure modes may arise that result in degraded operational states of the aerial vehicles. For example, one or more of the propulsion mechanisms may no longer operate normally due to various types of faults, which may be referred to as motor out situations. In order to improve the reliability, safety, and operational capability of the aerial vehicles, the aerial vehicles may implement one or more reconfigurations in response to such faults in order to maintain flight of the aerial vehicles and land at safe landing locations.

The various types of faults that may result in motor out situations may include damage or loss of function of one or more propellers or propeller blades, damage or loss of function of one or more motors, damage or loss of function of one or more motor controllers that are each in communication with a corresponding motor and propeller, damage or loss of function between one or more motor controllers and a flight controller that is in communication with each of the motor controllers, loss of power or other electrical signals between two or more components of the aerial vehicle, or various other types of faults.

In addition, the various types of faults may be detected in various manners. For example, damage or loss of function of one or more propellers or propeller blades may be detected by comparison of actual values of motor revolutions per minute (rpm) and applied current with expected values of motor rpm and applied current, since a motor rotating with damaged or missing propellers or blades may draw different values of current than expected values while rotating at a particular motor rpm. In addition, damage or loss of function of one or more motors may be detected by comparison of measured rpm versus commanded rpm, or by measurements and/or calculations related to motor efficiency. Further, various faults of one or more propellers, blades, and/or motors may be detected by one or more motor controllers, which may be provided as feedback to the flight controller. Moreover, various faults of one or more motor controllers may be detected by the flight controller.

In further example embodiments, various other types of sensors may be used to detect one or more of the various types of faults that result in motor out situations. For example, the sensors may include imaging devices or cameras that can capture images of portions of propellers, blades, and/or motors, which images may be processed to determine damage or loss of function of one or more components. In addition, the sensors may include inertial measurement units, accelerometers, gyroscopes, or similar types of sensors that may detect changes to flight operations or navigation of the aerial vehicle that may be caused by one or more faults that result in motor out situations. Various other types of sensors may also detect aspects of flight, navigation, movement, or operation of various components of the aerial vehicles to identify one or more faults. Moreover, the various types of faults may be detected by various combinations of methods described herein.

Figure 6A:
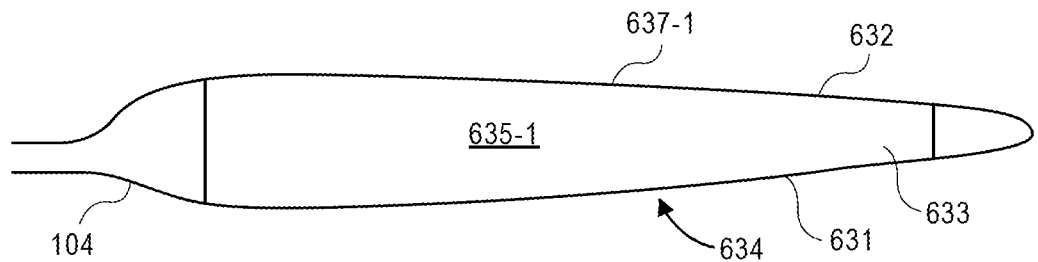
FIG. 6A illustrates an underside view of a propeller or propeller blade of a propulsion mechanism having a deployable flap, in accordance with disclosed implementations.

FIG. 6A illustrates an underside view of a propeller or propeller blade 104 of a propulsion mechanism having a deployable flap, in accordance with disclosed implementations.

As shown in FIG. 6A, the propeller blade 104 may include a leading edge 631, a trailing edge 632, an underside 633, and an upper side 634. In addition, the propeller blade 104 may include a modifiable section, e.g., flap 635-1, that is pivotably or movably coupled to the underside 633 of the propeller blade 104 at a pivotable connection, e.g., hinge 637-1. In the example embodiment illustrated in FIG. 6A, the hinge 637-1 may substantially be associated with the trailing edge 632 of the propeller blade 104. The propeller blade 104 and the flap 635-1 may be formed of various materials, such as graphite, carbon fiber, plastics, metals, other materials, or combinations thereof, and may be of any size and/or shape.

Figure 6B:
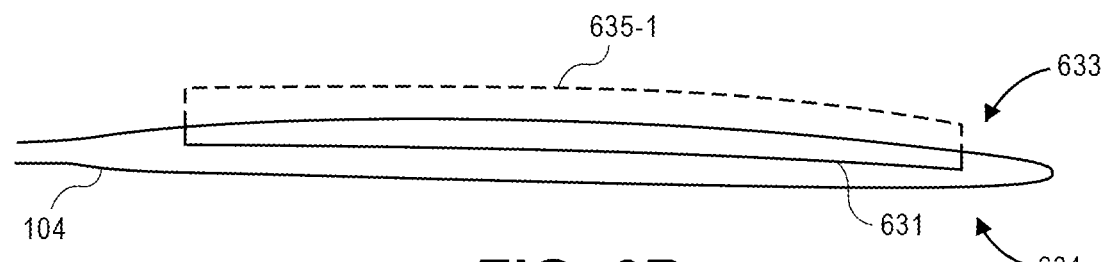
FIG. 6B illustrates a side view of a propeller or propeller blade of a propulsion mechanism having a deployable flap as illustrated in FIG. 6A, in accordance with disclosed implementations.
Figure 6C:
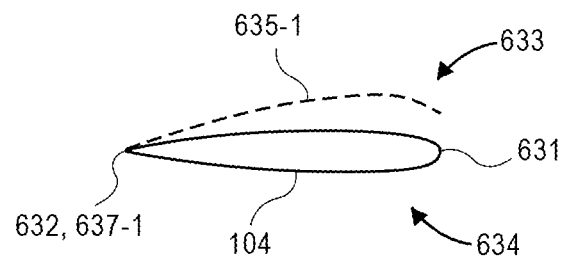
FIG. 6C illustrates an end view of a propeller or propeller blade of a propulsion mechanism having a deployable flap as illustrated in FIG. 6A, in accordance with disclosed implementations.

FIG. 6B illustrates a side view of a propeller or propeller blade 104 of a propulsion mechanism having a deployable flap as illustrated in FIG. 6A, in accordance with disclosed implementations, and FIG. 6C illustrates an end view of a propeller or propeller blade 104 of a propulsion mechanism having a deployable flap as illustrated in FIG. 6A, in accordance with disclosed implementations.

As shown in FIGS. 6B and 6C, the flap 635-1 may be modified or deployed between two or more configurations or positions. In a first configuration in which the flap 635-1 is not deployed, e.g., a closed or undeployed configuration, the flap 635-1 may substantially be aligned or positioned along the underside 633 of the propeller blade 104. In the first configuration, the flap 635-1 may not generate or produce any additional torque due to drag or air resistance during operation of the propeller blade 104. In a second configuration in which the flap 635-1 is deployed, e.g., an open or deployed configuration as illustrated in dashed lines in FIGS. 6B and 6C, the flap 635-1 may be deployed or opened to a desired angle relative to the underside 633 of the propeller blade 104. In the second configuration, the flap 635-1 may generate or produce additional torque due to drag or air resistance during operation of the propeller blade 104, which additional torque may be initiated, controlled, and/or modified to facilitate, improve, or increase controllability of an aerial vehicle.

Figure 6D:
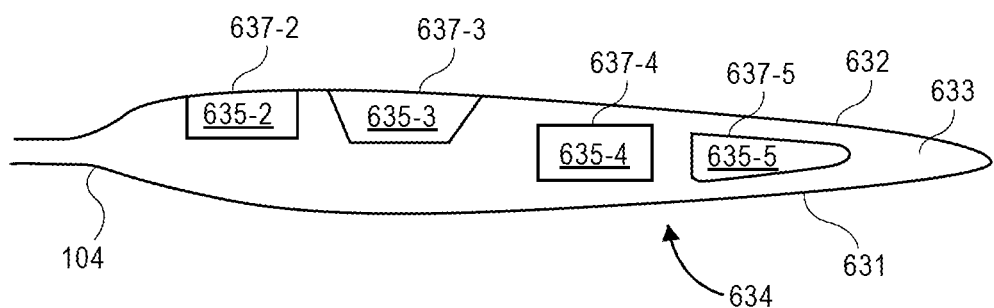
FIG. 6D illustrates an underside view of a propeller or propeller blade of a propulsion mechanism having a plurality of deployable flaps, in accordance with disclosed implementations.

FIG. 6D illustrates an underside view of a propeller or propeller blade 104 of a propulsion mechanism having a plurality of deployable flaps, in accordance with disclosed implementations.

As shown in FIG. 6D, the propeller blade 104 may include a leading edge 631, a trailing edge 632, an underside 633, and an upper side 634. In addition, the propeller blade 104 may include a plurality of modifiable sections, e.g., a plurality of flaps 635-2, 635-3, 635-4, 635-5, that are each pivotably or movably coupled to the underside 633 of the propeller blade 104 at respective pivotable connections, e.g., hinges 637-2, 637-3, 637-4, 637-5. In the example embodiment illustrated in FIG. 6D, the hinges 637-2, 637-3, 637-4, 637-5 may substantially be associated with or positioned adjacent the trailing edge 632 of the propeller blade 104. The propeller blade 104 and the plurality of flaps 635-2, 635-3, 635-4, 635-5 may be formed of various materials, such as graphite, carbon fiber, plastics, metals, other materials, or combinations thereof, and may be of any size and/or shape.

Similar to the illustrations of FIGS. 6B and 6C and associated descriptions, each of the plurality of flaps 635-2, 635-3, 635-4, 635-5 may be modified or deployed between two or more configurations or positions. In a first configuration in which a flap 635-2, 635-3, 635-4, 635-5 is not deployed, e.g., a closed or undeployed configuration, the flap 635-2, 635-3, 635-4, 635-5 may substantially be aligned or positioned along the underside 633 of the propeller blade 104. In the first configuration, the flap 635-2, 635-3, 635-4, 635-5 may not generate or produce any additional torque due to drag or air resistance during operation of the propeller blade 104. In a second configuration in which the flap 635-2, 635-3, 635-4, 635-5 is deployed, e.g., an open or deployed configuration, the flap 635-2, 635-3, 635-4, 635-5 may be deployed or opened to a desired angle relative to the underside 633 of the propeller blade 104. In the second configuration, the flap 635-2, 635-3, 635-4, 635-5 may generate or produce additional torque due to drag or air resistance during operation of the propeller blade 104, which additional torque may be initiated, controlled, and/or modified to facilitate, improve, or increase controllability of an aerial vehicle.

In addition, each of the flaps 635-2, 635-3, 635-4, 635-5 may be selectively and/or independently controlled between two or more configurations or positions. In this manner, the additional torque generated or produced due to drag or air resistance may be tuned, controlled, and/or modified based at least in part on the respective configurations of each of the flaps 635-2, 635-3, 635-4, 635-5 and their respective opening angles. For example, deploying flap 635-5 near a tip of the propeller blade 104 may generate greater additional torque than deploying flap 635-2 near a root of the propeller blade 104. In addition, deploying two or more of flaps 635-2, 635-3, 635-4, 635-5 may generate greater additional torque than deploying only one of flaps 635-2, 635-3, 635-4, 635-5.

One or more actuators may be associated with the one or more flaps 635 of the propeller blade 104, and may be operable to deploy the one or more flaps 635. Each of the actuators may be connected via electrical lines or wirelessly (not shown) to an aerial vehicle control system, a part thereof, or another component in communication with the aerial vehicle control system, in order to receive power and/or instructions or commands.

The one or more actuators may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, or various other types of actuators. In addition, the one or more actuators may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions. In example embodiments comprising actuators configured for one-time actuation, various manual repair, replacement, or other intervention may be performed following deployment of one or more flaps.

In example embodiments, the one or more actuators may comprise a clutch, switch, bias element, damper, spring-loaded actuator, magnetic actuator, and/or piezoelectric actuator that releases and/or deploys the one or more flaps 635 between two or more configurations, such that the one or more flaps 635 are opened to desired opening angles using aerodynamic drag or air resistance acting upon the deployed one or more flaps 635. In other example embodiments, the one or more actuators may comprise a servo, solenoid, motor, screw actuator, geared actuator, linear actuator, rotary actuator, magnetic actuator, and/or piezoelectric actuator that actuates and/or deploys the one or more flaps 635 between two or more configurations, such that the one or more flaps 635 are opened, closed, and/or deployed to desired opening angles using the actuators. In further example embodiments, the one or more flaps 635 may be adhered to the underside of the propeller blade via one or more adhesives, and the one or more actuators may comprise heat, a chemical, or a release agent that dissolves or otherwise causes release of the one or more adhesives, such that the one or more flaps 635 are opened to desired opening angles between two or more configurations using aerodynamic drag or air resistance acting upon the deployed one or more flaps 635.

Although FIGS. 6A-6D illustrate particular numbers, shapes, sizes, positions, orientations, and/or opening angles associated with flaps 635, in other example embodiments, different numbers, shapes, sizes, positions, orientations, and/or opening angles may be associated with one or more flaps 635. For example, one or more flaps 635 may have other shapes such as circular, polygonal, other regular shapes, or irregular shapes. In addition, one or more flaps 635 may be positioned at various locations on the underside, upper side, trailing edge, leading edge, or other surfaces or edges of the propeller blade. In one example, a first flap may be positioned on an underside near a leading edge, and a second flap may be positioned on an upper side near a leading edge, such that the first and second flaps form a clamshell-type structure when deployed or extended. Further, one or more flaps 635 may be oriented to open in different directions, e.g., by different placement of pivotable connections between the flaps and propeller blade. Moreover, one or more flaps 635 may be oriented to open to different opening angles, e.g., 10 degrees, 25 degrees, 45 degrees, 90 degrees, or other angles relative to the underside of the propeller blade. Furthermore, although only two configurations or positions are shown in FIGS. 6B and 6C, one or more flaps 635 may be modified or adjusted between three or more different configurations or positions.

Figure 7A:
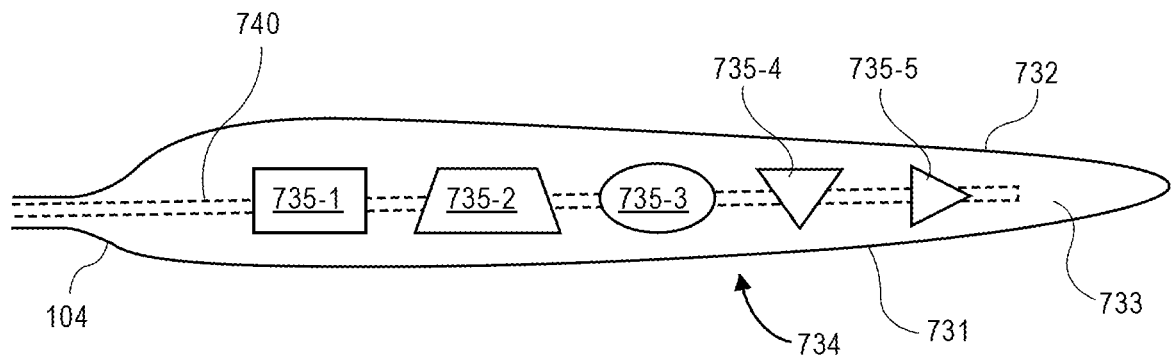
FIG. 7A illustrates an underside view of a propeller or propeller blade of a propulsion mechanism having a plurality of extendible protrusions, in accordance with disclosed implementations.
Figure 7B:
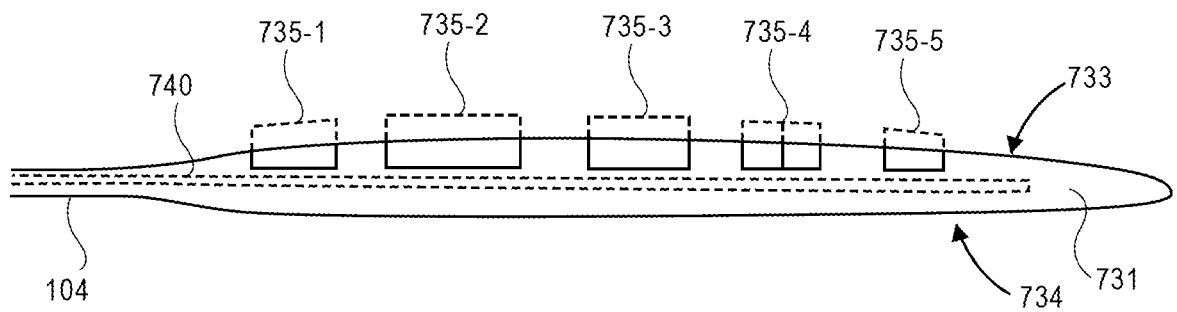
FIG. 7B illustrates a side view of a propeller or propeller blade of a propulsion mechanism having a plurality of extendible protrusions as illustrated in FIG. 7A, in accordance with disclosed implementations.

FIG. 7A illustrates an underside view of a propeller or propeller blade 104 of a propulsion mechanism having a plurality of extendible protrusions, in accordance with disclosed implementations, and FIG. 7B illustrates a side view of a propeller or propeller blade 104 of a propulsion mechanism having a plurality of extendible protrusions as illustrated in FIG. 7A, in accordance with disclosed implementations.

As shown in FIGS. 7A and 7B, the propeller blade 104 may include a leading edge 731, a trailing edge 732, an underside 733, and an upper side 734. In addition, the propeller blade 104 may include one or more modifiable sections, e.g., protrusions 735-1, 735-2, 735-3, 735-4, 735-5, that are each extendibly, retractably, and/or movably coupled to the underside 733 of the propeller blade 104. The propeller blade 104 and the protrusions 735-1, 735-2, 735-3, 735-4, 735-5 may be formed of various materials, such as graphite, carbon fiber, plastics, metals, other materials, or combinations thereof, and may be of any size and/or shape.

Each of the plurality of protrusions 735-1, 735-2, 735-3, 735-4, 735-5 may be extended, retracted, and/or modified between two or more configurations or positions. In a first configuration in which a protrusion 735-1, 735-2, 735-3, 735-4, 735-5 is not extended, e.g., a retracted or undeployed configuration, the protrusion 735-1, 735-2, 735-3, 735-4, 735-5 may substantially be aligned or flush with the underside 733 of the propeller blade 104. In the first configuration, the protrusion 735-1, 735-2, 735-3, 735-4, 735-5 may not generate or produce any additional torque due to drag or air resistance during operation of the propeller blade 104. In a second configuration in which the protrusion 735-1, 735-2, 735-3, 735-4, 735-5 is extended, e.g., an extended or deployed configuration as illustrated by upper dashes lines in FIG. 7B, the protrusion 735-1, 735-2, 735-3, 735-4, 735-5 may be extended or deployed to a desired distance relative to the underside 733 of the propeller blade 104. In the second configuration, the protrusion 735-1, 735-2, 735-3, 735-4, 735-5 may generate or produce additional torque due to drag or air resistance during operation of the propeller blade 104, which additional torque may be initiated, controlled, and/or modified to facilitate, improve, or increase controllability of an aerial vehicle.

In addition, each of the protrusions 735-1, 735-2, 735-3, 735-4, 735-5 may be selectively and/or independently controlled between two or more configurations or positions. In this manner, the additional torque generated or produced due to drag or air resistance may be tuned, controlled, and/or modified based at least in part on the respective configurations of each of the protrusions 735-1, 735-2, 735-3, 735-4, 735-5 and their respective extended distances. For example, extending protrusion 735-5 near a tip of the propeller blade 104 may generate greater additional torque than extending protrusion 735-1 near a root of the propeller blade 104. In addition, extending two or more of protrusions 735-1, 735-2, 735-3, 735-4, 735-5 may generate greater additional torque than extending only one of protrusions 735-1, 735-2, 735-3, 735-4, 735-5.

One or more actuators may be associated with the one or more protrusions 735 of the propeller blade 104, and may be operable to extend, retract, and/or modify the one or more protrusions 735. Each of the actuators may be connected via electrical lines or wirelessly (not shown) to an aerial vehicle control system, a part thereof, or another component in communication with the aerial vehicle control system, in order to receive power and/or instructions or commands.

The one or more actuators may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, a pneumatic actuator, a hydraulic actuator, or various other types of actuators. In addition, the one or more actuators may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions. In example embodiments comprising actuators configured for one-time actuation, various manual repair, replacement, or other intervention may be performed following extension, retraction, and/or deployment of one or more protrusions.

In example embodiments, the one or more actuators may comprise a clutch, switch, bias element, damper, spring-loaded actuator, magnetic actuator, and/or piezoelectric actuator that extends, retracts, and/or deploys the one or more protrusions 735 between two or more configurations, such that the one or more protrusions 735 are extended to desired distances. In other example embodiments, the one or more actuators may comprise a servo, solenoid, motor, screw actuator, geared actuator, linear actuator, rotary actuator, magnetic actuator, and/or piezoelectric actuator that actuates and/or deploys the one or more protrusions 735 between two or more configurations, such that the one or more protrusions 735 are extended, retracted, and/or deployed to desired distances using the actuators. In further example embodiments, the one or more actuators may comprise a pneumatic actuator and/or hydraulic actuator that actuates and/or deploys the one or more protrusions 735 between two or more configurations via gas or fluid pressure. In still further example embodiments, the one or more protrusions 735 may be adhered to the underside of the propeller blade via one or more adhesives, and the one or more actuators may comprise heat, a chemical, or a release agent that dissolves or otherwise causes release of the one or more adhesives, such that the one or more protrusions 735 are extended to desired extended distances between two or more configurations.

In one example embodiment, the one or more actuators may comprise a shaft 740 rotated by a motor, rotary actuator, or other actuator, and the shaft 740 may comprise one or more cams associated with respective protrusions 735, such that rotation of the shaft 740 and associated cams may cause extension and/or retraction of one or more protrusions 735. In other example embodiments, each protrusion 735 may be associated with a respective shaft, cam, and actuator to provide independent actuation of each protrusion.

In another example embodiment, the one or more actuators may comprise a tube, pipe, or conduit 740 operably connected to a pneumatic or hydraulic actuator by which gas or fluid pressure may be applied to respective protrusions 735 via one or more expandable bladders, such that expansion and/or deflation of one or more bladders may cause extension and/or retraction of one or more protrusions 735. In other example embodiments, each protrusion 735 may be associated with a respective conduit, bladder, and actuator to provide independent actuation of each protrusion. In further example embodiments utilizing gas or fluid pressure, centripetal acceleration due to rotation of a propeller blade may be leveraged to cause gas or fluid to expand one or more bladders, in which case a pneumatic or hydraulic actuator may be optional.

Although FIGS. 7A and 7B illustrate particular numbers, shapes, sizes, positions, orientations, and/or extended distances associated with protrusions 735, in other example embodiments, different numbers, shapes, sizes, positions, orientations, and/or extended distances may be associated with one or more protrusions 735. For example, one or more protrusions 735 may have other shapes such as circular, polygonal, other regular shapes, or irregular shapes. In addition, one or more protrusions 735 may be positioned or oriented at various locations on the underside, upper side, trailing edge, leading edge, or other surfaces or edges of the propeller blade. Further, one or more protrusions 735 may be oriented to extend different distances, e.g., 1 mm, 2 mm, or other distances, and/or in different directions, e.g., 90 degrees, 75 degrees, 45 degrees, or other angles, relative to the underside of the propeller blade. Furthermore, although only two configurations or positions are shown in FIGS. 7A and 7B, one or more protrusions 735 may be modified or adjusted between three or more different configurations or positions.

Figure 8A:
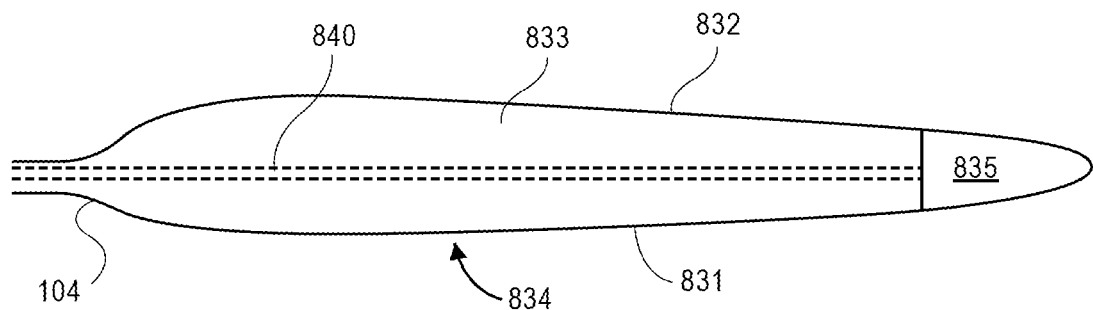
FIG. 8A illustrates an underside view of a propeller or propeller blade of a propulsion mechanism having a rotatable blade section, in accordance with disclosed implementations.
Figure 8B:
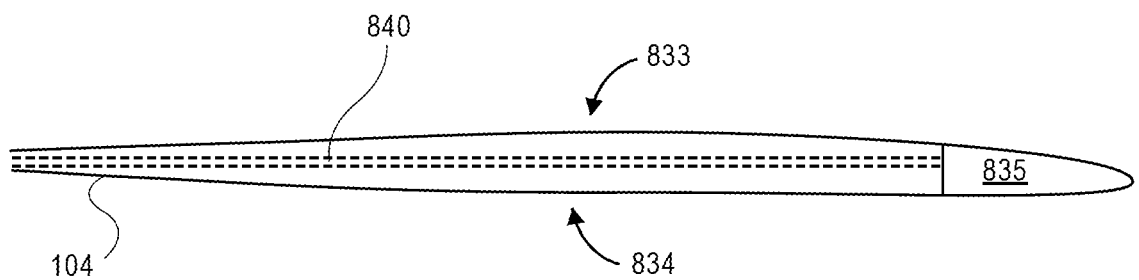
FIG. 8B illustrates a side view of a propeller or propeller blade of a propulsion mechanism having a rotatable blade section as illustrated in FIG. 8A, in accordance with disclosed implementations.
Figure 8C:
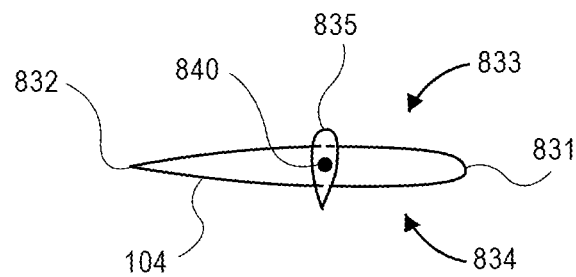
FIG. 8C illustrates an end view of a propeller or propeller blade of a propulsion mechanism having a rotatable blade section as illustrated in FIG. 8A, in accordance with disclosed implementations.

FIG. 8A illustrates an underside view of a propeller or propeller blade 104 of a propulsion mechanism having a rotatable blade section, in accordance with disclosed implementations, FIG. 8B illustrates a side view of a propeller or propeller blade 104 of a propulsion mechanism having a rotatable blade section as illustrated in FIG. 8A, in accordance with disclosed implementations, and FIG. 8C illustrates an end view of a propeller or propeller blade 104 of a propulsion mechanism having a rotatable blade section as illustrated in FIG. 8A, in accordance with disclosed implementations.

As shown in FIGS. 8A-8C, the propeller blade 104 may include a leading edge 831, a trailing edge 832, an underside 833, and an upper side 834. In addition, the propeller blade 104 may include one or more modifiable sections, e.g., tip section 835, that is rotatably and/or movably coupled to the tip of the propeller blade 104. The propeller blade 104 and the tip section 835 may be formed of various materials, such as graphite, carbon fiber, plastics, metals, other materials, or combinations thereof, and may be of any size and/or shape.

The tip section 835 may be rotated and/or modified between two or more configurations or positions. In a first configuration in which the tip section 835 is not rotated or modified, e.g., a normal operation or low torque configuration, the tip section 835 may substantially be aligned with a remainder of the propeller blade 104. In the first configuration, the tip section 835 may not generate or produce any additional torque due to drag or air resistance during operation of the propeller blade 104. In a second configuration in which the tip section 835 is rotated or modified, e.g., a drag operation or high torque configuration as illustrated in FIG. 8C, the tip section 835 may be rotated or modified a desired angle relative to a remainder of the propeller blade 104. In the second configuration, the tip section 835 may generate or produce additional torque due to drag or air resistance during operation of the propeller blade 104, which additional torque may be initiated, controlled, and/or modified to facilitate, improve, or increase controllability of an aerial vehicle.

Although FIGS. 8A-8C illustrate only one modifiable blade section, in some example embodiments, the propeller blade 104 may comprise a plurality of modifiable blade sections, each of which may be rotated and/or modified between two or more configurations. In addition, each of the plurality of modifiable blade sections may be selectively and/or independently controlled between two or more configurations or positions. In this manner, the additional torque generated or produced due to drag or air resistance may be tuned, controlled, and/or modified based at least in part on the respective configurations of each of the plurality of modifiable blade sections and their respective angles. For example, rotating the tip section 835 near a tip of the propeller blade 104 may generate greater additional torque than rotating a modifiable blade section near a root of the propeller blade 104. In addition, rotating two or more modifiable blade sections may generate greater additional torque than rotating only one of a plurality of modifiable blade sections.

One or more actuators may be associated with the one or more blade sections of the propeller blade 104, and may be operable to rotate and/or modify the one or more blade sections. Each of the actuators may be connected via electrical lines or wirelessly (not shown) to an aerial vehicle control system, a part thereof, or another component in communication with the aerial vehicle control system, in order to receive power and/or instructions or commands.

The one or more actuators may include one or more of a clutch, a switch, a bias element or spring, a damper, a spring-loaded actuator, a servo, a solenoid, a motor, a screw actuator, a geared actuator, a magnetic actuator, a linear actuator, a rotary actuator, a piezoelectric actuator, or various other types of actuators. In addition, the one or more actuators may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions. In example embodiments comprising actuators configured for one-time actuation, various manual repair, replacement, or other intervention may be performed following rotation and/or movement of one or more blade sections.

In example embodiments, the one or more actuators may comprise a clutch, switch, bias element, damper, spring-loaded actuator, magnetic actuator, and/or piezoelectric actuator that rotates and/or modifies the one or more blade sections between two or more configurations, such that the one or more blade sections are rotated to desired angles. In other example embodiments, the one or more actuators may comprise a servo, solenoid, motor, screw actuator, geared actuator, linear actuator, rotary actuator, magnetic actuator, and/or piezoelectric actuator that rotates and/or modifies the one or more blade sections between two or more configurations, such that the one or more blade sections are rotated to desired angles using the actuators.

In one example embodiment, the one or more actuators may comprise a shaft 840 rotated by a motor, rotary actuator, or other actuator, and the shaft 840 may be operably connected to the tip section 835, such that rotation of the shaft 840 may cause rotation and/or modification of the tip section. In other example embodiments, each blade section of a plurality of blade sections may be associated with a respective shaft and actuator to provide independent actuation and rotation of each blade section.

Although FIGS. 8A-8C illustrate particular numbers, shapes, sizes, positions, orientations, and/or angles associated with blade sections, in other example embodiments, different numbers, shapes, sizes, positions, orientations, and/or angles may be associated with one or more blade sections. For example, one or more blade sections may have other shapes such as circular, polygonal, other regular shapes, or irregular shapes, and/or one or more blade sections may comprise only a portion of the propeller blade, e.g., less than an entire chord length and/or less than an entire span of the propeller blade. In addition, one or more blade sections may be positioned or oriented at various locations of the propeller blade, e.g., near the tip, near the root, or various other locations. Further, one or more blade sections may be configured to rotate to different angles, e.g., 90 degrees, 45 degrees, 30 degrees, or other angles, relative to a remainder of the propeller blade. Furthermore, although only two configurations or positions are shown in FIGS. 8A-8C, one or more blade sections may be rotated or modified between three or more different configurations or positions.

Figure 9A:
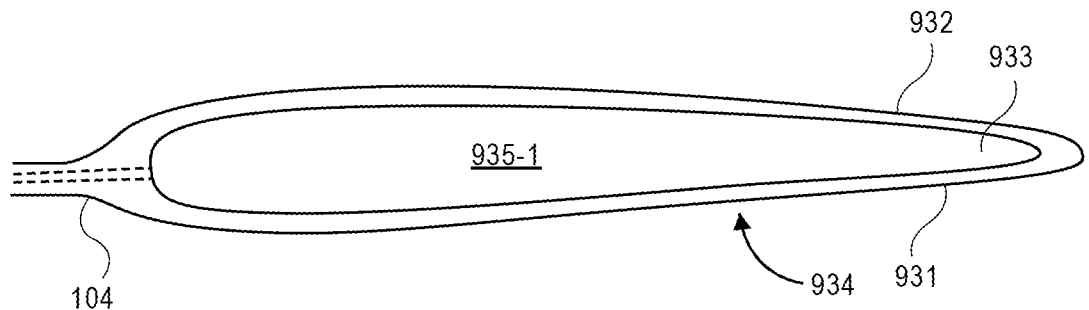
FIG. 9A illustrates an underside view of a propeller or propeller blade of a propulsion mechanism having an expandable blade section, in accordance with disclosed implementations.
Figure 9B:
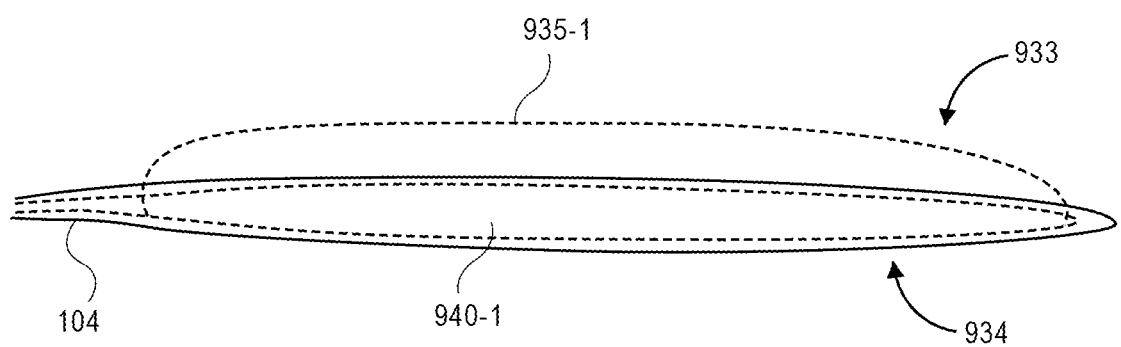
FIG. 9B illustrates a side view of a propeller or propeller blade of a propulsion mechanism having an expandable blade section as illustrated in FIG. 9A, in accordance with disclosed implementations.

FIG. 9A illustrates an underside view of a propeller or propeller blade 104 of a propulsion mechanism having an expandable blade section, in accordance with disclosed implementations, and FIG. 9B illustrates a side view of a propeller or propeller blade 104 of a propulsion mechanism having an expandable blade section as illustrated in FIG. 9A, in accordance with disclosed implementations.

As shown in FIGS. 9A and 9B, the propeller blade 104 may include a leading edge 931, a trailing edge 932, an underside 933, and an upper side 934. In addition, the propeller blade 104 may include a modifiable section, e.g., expandable section 935-1, that may be expanded and/or retracted from the underside of the propeller blade 104. The propeller blade 104 may be formed of various materials, such as graphite, carbon fiber, plastics, metals, other materials, or combinations thereof, and may be of any size and/or shape. In addition, the expandable section 935-1 may be formed of various materials, such as plastics, fabrics, mesh, or other flexible and/or expandable materials.

The expandable section 935-1 may be modified between two or more configurations or positions. In a first configuration in which the expandable section 935-1 is not expanded or modified, e.g., a normal operation or low torque configuration, the expandable section 935-1 may substantially be aligned or flush with a remainder of the propeller blade 104. In the first configuration, the expandable section 935-1 may not generate or produce any additional torque due to drag or air resistance during operation of the propeller blade 104. In a second configuration in which the expandable section 935-1 is expanded or modified, e.g., a drag operation or high torque configuration as illustrated by the outer dashed lines in FIG. 9B, the expandable section 935-1 may be expanded or modified to a desired shape and/or size relative to a remainder of the propeller blade 104. In the second configuration, the expandable section 935-1 may generate or produce additional torque due to drag or air resistance during operation of the propeller blade 104, which additional torque may be initiated, controlled, and/or modified to facilitate, improve, or increase controllability of an aerial vehicle.

Figure 9C:
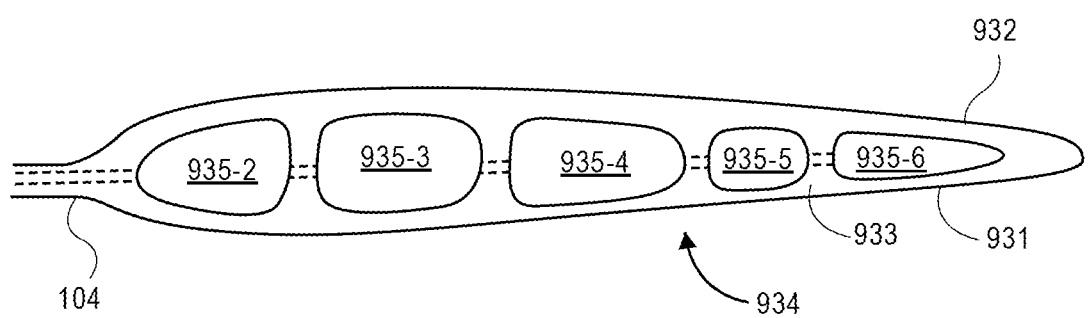
FIG. 9C illustrates an underside view of a propeller or propeller blade of a propulsion mechanism having a plurality of expandable blade sections, in accordance with disclosed implementations.
Figure 9D:
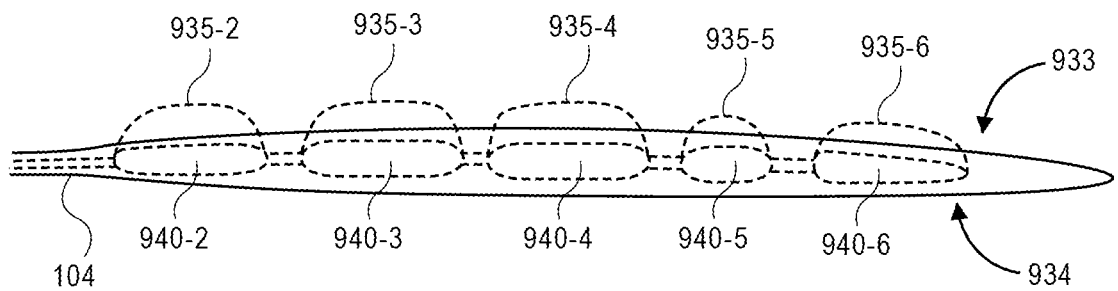
FIG. 9D illustrates a side view of a propeller or propeller blade of a propulsion mechanism having a plurality of expandable blade sections as illustrated in FIG. 9C, in accordance with disclosed implementations.

FIG. 9C illustrates an underside view of a propeller or propeller blade 104 of a propulsion mechanism having a plurality of expandable blade sections, in accordance with disclosed implementations, and FIG. 9D illustrates a side view of a propeller or propeller blade 104 of a propulsion mechanism having a plurality of expandable blade sections as illustrated in FIG. 9C, in accordance with disclosed implementations.

As shown in FIGS. 9C and 9D, the propeller blade 104 may comprise a plurality of modifiable blade sections, e.g., expandable sections 935-2, 935-3, 935-4, 935-5, 935-6, each of which may be expanded and/or retracted from the underside of the propeller blade between two or more configurations. In a first configuration in which the expandable sections 935-2, 935-3, 935-4, 935-5, 935-6 are not expanded or modified, e.g., a normal operation or low torque configuration, the expandable sections 935-2, 935-3, 935-4, 935-5, 935-6 may substantially be aligned or flush with a remainder of the propeller blade 104. In the first configuration, the expandable sections 935-2, 935-3, 935-4, 935-5, 935-6 may not generate or produce any additional torque due to drag or air resistance during operation of the propeller blade 104. In a second configuration in which the expandable sections 935-2, 935-3, 935-4, 935-5, 935-6 are expanded or modified, e.g., a drag operation or high torque configuration as illustrated by the outer dashed lines in FIG. 9D, the expandable sections 935-2, 935-3, 935-4, 935-5, 935-6 may be expanded or modified to a desired shape and/or size relative to a remainder of the propeller blade 104. In the second configuration, the expandable sections 935-2, 935-3, 935-4, 935-5, 935-6 may generate or produce additional torque due to drag or air resistance during operation of the propeller blade 104, which additional torque may be initiated, controlled, and/or modified to facilitate, improve, or increase controllability of an aerial vehicle.

In addition, each of the plurality of modifiable blade sections may be selectively and/or independently controlled between two or more configurations or positions. In this manner, the additional torque generated or produced due to drag or air resistance may be tuned, controlled, and/or modified based at least in part on the respective configurations of each of the plurality of modifiable blade sections and their respective shapes and/or sizes. For example, expanding the expandable section 935-6 near a tip of the propeller blade 104 may generate greater additional torque than expanding the expandable section 935-2 near a root of the propeller blade 104. In addition, expanding two or more expandable blade sections may generate greater additional torque than expanding only one of a plurality of expandable blade sections.

One or more actuators may be associated with the one or more blade sections of the propeller blade 104, and may be operable to expand and/or retract the one or more blade sections. Each of the actuators may be connected via electrical lines or wirelessly (not shown) to an aerial vehicle control system, a part thereof, or another component in communication with the aerial vehicle control system, in order to receive power and/or instructions or commands.

The one or more actuators may include one or more of a pneumatic actuator, a hydraulic actuator, a gas or fluid discharge element, an expanding material such as expanding foam, or various other types of actuators that may deliver and/or modify gas or fluid pressure associated with the one or more expandable blade sections. In addition, the one or more actuators may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions. In example embodiments comprising actuators configured for one-time actuation, various manual repair, replacement, or other intervention may be performed following expansion and/or retraction of one or more blade sections.

In one example embodiment, the one or more actuators may comprise a pneumatic actuator and/or hydraulic actuator that expands and/or retracts one or more bladders 940-1, 940-2, 940-3, 940-4, 940-5, 940-6 associated with respective expandable sections 935-1, 935-2, 935-3, 935-4, 935-5, 935-6 between two or more configurations via gas or fluid pressure. The one or more bladders 940 may comprise bags, containers, or other vessels, and may be formed of flexible and/or expandable materials, such as plastics, rubbers, silicone, or other flexible materials.

In another example embodiment, the one or more actuators may comprise a gas or fluid discharge element, e.g., a carbon dioxide cartridge or other gas cartridge, that may release gas or fluid into one or more bladders 940 associated with respective expandable sections 935 to modify the expandable sections 935 between two or more configurations. In a further example embodiment, the one or more actuators may comprise an expanding material, e.g., expandable foam, two-part expandable form, multi-part expandable foam, various other types of one- or multi-part expanding materials, or various other chemical reactions that may release gas or fluids, that may expand into one or more bladders 940 associated with respective expandable sections 935 to modify the expandable sections 935 between two or more configurations. In other example embodiments, each expandable section 935 and associated bladder 940 may be associated with a respective actuator, e.g., pneumatic or hydraulic actuator, gas cartridge, or expanding material, to provide independent actuation of each expandable section. In further example embodiments utilizing gas or fluid pressure, centripetal acceleration due to rotation of a propeller blade may be leveraged to cause gas or fluid to expand one or more bladders, in which case a pneumatic or hydraulic actuator may be optional.

In still further example embodiments, in place of or in addition to one or more bladders 940 and associated actuators, the one or more actuators may further comprise motors, springs, solenoids, servos, linear actuators, or other types of actuators that may expand and/or retract one or more expandable sections. For example, a compressed spring may be released, a solenoid may be extended, and/or other actuators may be actuated to physically push, pull, stretch, expand, retract, or otherwise modify one or more expandable sections.

Although FIGS. 9A-9D illustrate particular numbers, shapes, sizes, positions, orientations, and/or expanded shapes or sizes associated with blade sections, in other example embodiments, different numbers, shapes, sizes, positions, orientations, and/or expanded shapes or sizes may be associated with one or more blade sections. For example, one or more blade sections may have other shapes such as circular, polygonal, other regular shapes, or irregular shapes. In addition, one or more blade sections may be positioned or oriented at various locations on the underside, upper side, trailing edge, leading edge, or other surfaces or edges of the propeller blade, e.g., near the tip, near the root, or various other locations. Further, one or more blade sections may be configured to expand to different shapes and/or sizes, e.g., 1 mm, 2 mm, curved surface, angular surface, or other shapes or sizes, relative to a remainder of the propeller blade. Furthermore, although only two configurations or positions are shown in FIGS. 9A-9D, one or more blade sections may be expanded and/or retracted between three or more different configurations or positions.

Figure 10A:
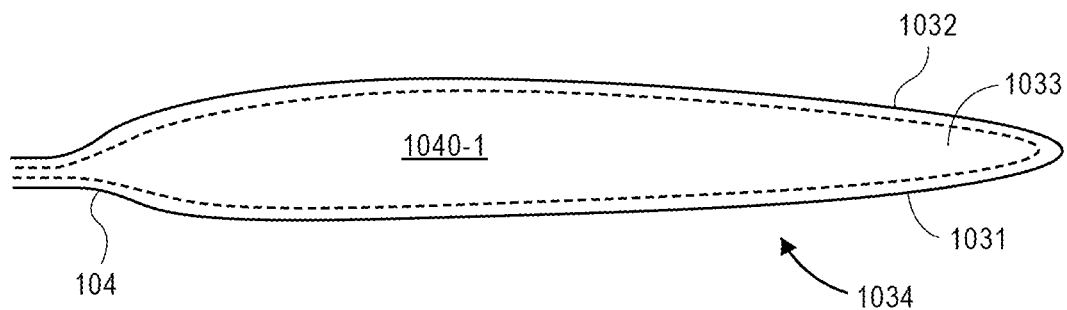
FIG. 10A illustrates an underside view of an expandable propeller or propeller blade of a propulsion mechanism having an expandable bladder, in accordance with disclosed implementations.
Figure 10B:
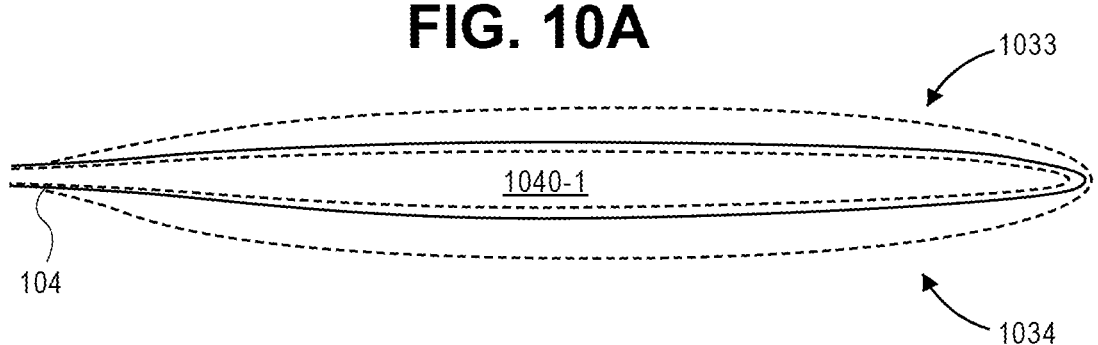
FIG. 10B illustrates a side view of an expandable propeller or propeller blade of a propulsion mechanism having an expandable bladder as illustrated in FIG. 10A, in accordance with disclosed implementations.

FIG. 10A illustrates an underside view of an expandable propeller or propeller blade 104 of a propulsion mechanism having an expandable bladder, in accordance with disclosed implementations, and FIG. 10B illustrates a side view of an expandable propeller or propeller blade 104 of a propulsion mechanism having an expandable bladder as illustrated in FIG. 10A, in accordance with disclosed implementations.

As shown in FIGS. 10A and 10B, the propeller blade 104 may include a leading edge 1031, a trailing edge 1032, an underside 1033, and an upper side 1034. In addition, the propeller blade 104 may be formed of a flexible and/or expandable material that may allow substantially the entire propeller blade 104 to be expanded and/or retracted. The propeller blade 104 may be formed of various materials, such as plastics, fabrics, mesh, or other flexible and/or expandable materials, and may be of any size and/or shape. In addition, the propeller blade 104 may include a flexible and/or expandable bladder 1040-1 that may be actuated to expand and/or retract the expandable propeller blade 104. The bladder 1040 may comprise a bag, container, or other vessel, and may be formed of flexible and expandable materials, such as plastics, rubbers, silicone, or other flexible materials.

The expandable propeller blade 104 may be modified between two or more configurations or positions. In a first configuration in which the expandable propeller blade 104 is not expanded or modified, e.g., a normal operation or low torque configuration, the expandable propeller blade 104 may have a first shape, size, cross-section, or other parameters. In the first configuration, the expandable propeller blade 104 may not generate or produce any additional torque due to drag or air resistance during operation of the propeller blade 104. In a second configuration in which the expandable propeller blade 104 is expanded or modified, e.g., a drag operation or high torque configuration as illustrated by the outer dashed lines in FIG. 10B, the expandable propeller blade 104 may be expanded or modified to a desired second shape, size, cross-section, or other parameters. In the second configuration, the expandable propeller blade 104 may generate or produce additional torque due to drag or air resistance during operation of the propeller blade 104, which additional torque may be initiated, controlled, and/or modified to facilitate, improve, or increase controllability of an aerial vehicle.

Figure 10C:
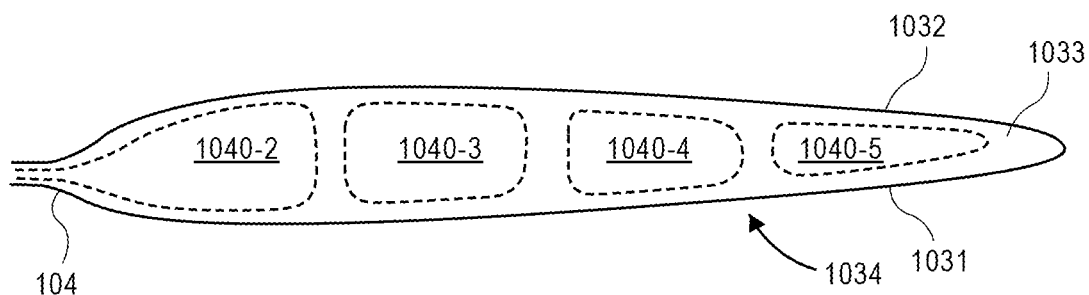
FIG. 10C illustrates an underside view of an expandable propeller or propeller blade of a propulsion mechanism having a plurality of expandable bladders, in accordance with disclosed implementations.
Figure 10D:
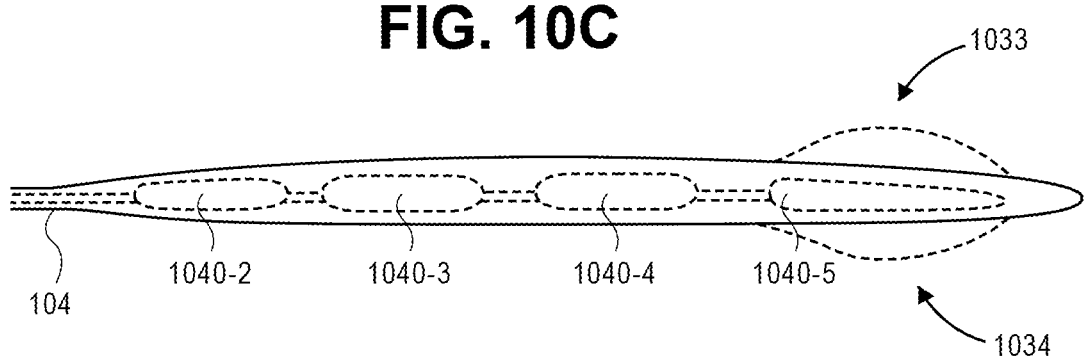
FIG. 10D illustrates a side view of an expandable propeller or propeller blade of a propulsion mechanism having a plurality of expandable bladders as illustrated in FIG. 10C, in accordance with disclosed implementations.

FIG. 10C illustrates an underside view of an expandable propeller or propeller blade 104 of a propulsion mechanism having a plurality of expandable bladders, in accordance with disclosed implementations, and FIG. 10D illustrates a side view of an expandable propeller or propeller blade 104 of a propulsion mechanism having a plurality of expandable bladders as illustrated in FIG. 10C, in accordance with disclosed implementations.

As shown in FIGS. 10C and 10D, the expandable propeller blade 104 may comprise a plurality of bladders 1040-2, 1040-3, 1040-4, 1040-5, each of which may be actuated to expand and/or retract at least a portion of the expandable propeller blade between two or more configurations. In a first configuration in which the expandable bladders 1040 are not expanded or modified, e.g., a normal operation or low torque configuration, the expandable propeller blade 104 may have a first shape, size, cross-section, or other parameters. In the first configuration, the expandable propeller blade 104 may not generate or produce any additional torque due to drag or air resistance during operation of the propeller blade 104. In a second configuration in which one or more expandable bladders 1040 are expanded or modified, e.g., a drag operation or high torque configuration as illustrated by the outer dashed lines around bladder 1040-5 in FIG. 10D, the expandable propeller blade 104 may be expanded or modified to a desired second shape, size, cross-section, or other parameters. In the second configuration, the expandable propeller blade 104 may generate or produce additional torque due to drag or air resistance during operation of the propeller blade 104, which additional torque may be initiated, controlled, and/or modified to facilitate, improve, or increase controllability of an aerial vehicle.

In addition, a plurality of sections or portions of the expandable propeller blade 104 may be selectively and/or independently controlled between two or more configurations or positions via one or more bladders 1040. In this manner, the additional torque generated or produced due to drag or air resistance may be tuned, controlled, and/or modified based at least in part on the respective configurations of each of the plurality of sections and their respective shapes, sizes, cross-sections, or other parameters. For example, expanding the bladder 1040-5 and associated section of the propeller blade near a tip of the propeller blade 104 may generate greater additional torque than expanding the bladder 1040-2 and associated section of the propeller blade near a root of the propeller blade 104. In addition, expanding two or more expandable bladders and associated sections of the propeller blade may generate greater additional torque than expanding only one of a plurality of expandable bladders and an associated section of the propeller blade.

One or more actuators may be associated with the one or more sections of the expandable propeller blade 104, and may be operable to expand and/or retract the one or more sections. Each of the actuators may be connected via electrical lines or wirelessly (not shown) to an aerial vehicle control system, a part thereof, or another component in communication with the aerial vehicle control system, in order to receive power and/or instructions or commands.

The one or more actuators may include one or more of a pneumatic actuator, a hydraulic actuator, a gas or fluid discharge element, an expanding material such as expanding foam, or various other types of actuators that may deliver and/or modify gas or fluid pressure associated with the one or more sections of the expandable propeller blade 104. In addition, the one or more actuators may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions. In example embodiments comprising actuators configured for one-time actuation, various manual repair, replacement, or other intervention may be performed following expansion and/or retraction of one or more sections of the expandable propeller blade 104.

In one example embodiment, the one or more actuators may comprise a pneumatic actuator and/or hydraulic actuator that expands and/or retracts one or more bladders 1040 associated with respective sections of an expandable propeller blade 104 between two or more configurations via gas or fluid pressure. As described herein, the one or more bladders 1040 may comprise bags, containers, or other vessels, and may be formed of flexible and expandable materials, such as plastics, rubbers, silicone, or other flexible materials.

In another example embodiment, the one or more actuators may comprise a gas or fluid discharge element, e.g., a carbon dioxide cartridge or other gas cartridge, that may release gas or fluid into one or more bladders 1040 associated with respective sections of an expandable propeller blade 104 to modify the sections between two or more configurations. In a further example embodiment, the one or more actuators may comprise an expanding material, e.g., expandable foam, two-part expandable form, multi-part expandable foam, various other types of one- or multi-part expanding materials, or various other chemical reactions that may release gas or fluids, that may expand into one or more bladders 1040 associated with respective sections of an expandable propeller blade 104 to modify the sections between two or more configurations. In other example embodiments, each section of an expandable propeller blade 104 and associated bladder 1040 may be associated with a respective actuator, e.g., pneumatic or hydraulic actuator, gas cartridge, or expanding material, to provide independent actuation of each section of an expandable propeller blade 104. In further example embodiments utilizing gas or fluid pressure, centripetal acceleration due to rotation of a propeller blade may be leveraged to cause gas or fluid to expand one or more bladders, in which case a pneumatic or hydraulic actuator may be optional.

In still further example embodiments, in place of or in addition to one or more bladders 1040 and associated actuators, the one or more actuators may further comprise motors, springs, solenoids, servos, linear actuators, or other types of actuators that may expand and/or retract one or more sections of an expandable propeller blade. For example, a compressed spring may be released, a solenoid may be extended, and/or other actuators may be actuated to physically push, pull, stretch, expand, retract, or otherwise modify one or more sections of an expandable propeller blade.

Although FIGS. 10A-10D illustrate particular numbers, shapes, sizes, positions, orientations, and/or expanded shapes or sizes associated with blade sections, in other example embodiments, different numbers, shapes, sizes, positions, orientations, and/or expanded shapes or sizes may be associated with one or more blade sections of an expandable propeller blade. For example, one or more sections may have other shapes or sizes. In addition, one or more sections may be positioned or oriented at various locations on the underside, upper side, trailing edge, leading edge, or other surfaces or edges of the propeller blade, e.g., near the tip, near the root, or various other locations. Further, one or more sections may be configured to expand to different shapes and/or sizes, e.g., 1 mm, 2 mm, curved surface, angular surface, or other shapes or sizes, relative to a remainder of the propeller blade. Furthermore, although only two configurations or positions are shown in FIGS. 10A-10D, one or more sections of an expandable propeller blade may be expanded and/or retracted between three or more different configurations or positions.

Figure 11A:
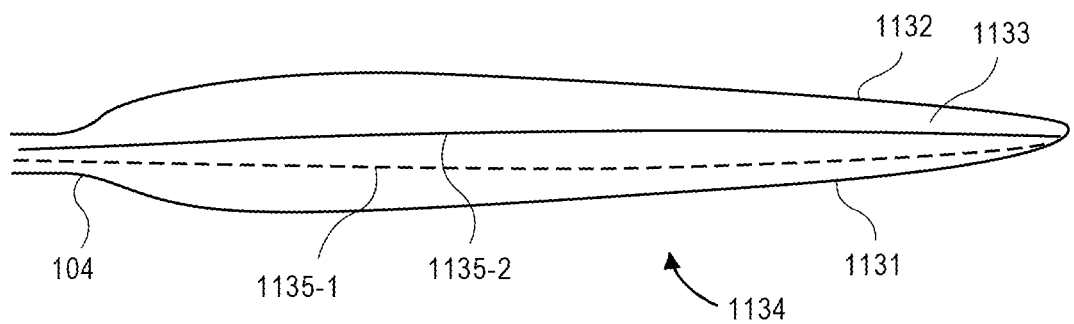
FIG. 11A illustrates an underside view of an expandable propeller or propeller blade of a propulsion mechanism having an expandable bladder, in accordance with disclosed implementations.
Figure 11B:
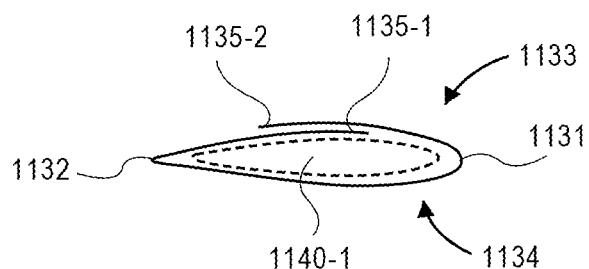
FIG. 11B illustrates an end view of an expandable propeller or propeller blade of a propulsion mechanism having an expandable bladder as illustrated in FIG. 11A in a first configuration, in accordance with disclosed implementations.
Figure 11C:
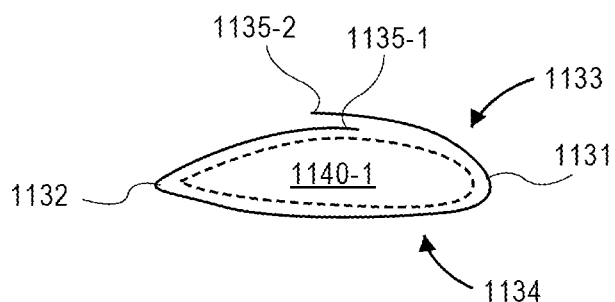
FIG. 11C illustrates an end view of an expandable propeller or propeller blade of a propulsion mechanism having an expandable bladder as illustrated in FIG. 11A in a second configuration, in accordance with disclosed implementations.

FIG. 11A illustrates an underside view of an expandable propeller or propeller blade 104 of a propulsion mechanism having an expandable bladder, in accordance with disclosed implementations, FIG. 11B illustrates an end view of an expandable propeller or propeller blade 104 of a propulsion mechanism having an expandable bladder as illustrated in FIG. 11A in a first configuration, in accordance with disclosed implementations, and FIG. 11C illustrates an end view of an expandable propeller or propeller blade 104 of a propulsion mechanism having an expandable bladder as illustrated in FIG. 11A in a second configuration, in accordance with disclosed implementations.

As shown in FIGS. 11A-11C, the propeller blade 104 may include a leading edge 1131, a trailing edge 1132, an underside 1133, and an upper side 1134. The propeller blade 104 may also include two or more seams or edges 1135-1, 1135-2 that may together form a movable joint, such as a slip joint, a sliding joint, or other type of expandable and/or retractable joint. In addition, the propeller blade 104 may be formed at least partially of a flexible and/or expandable material that may allow at least a portion of the propeller blade 104 to be expanded and/or retracted, e.g., by relative movement of the seams 1135-1, 1135-2 of the movable joint. The propeller blade 104 may be formed of various materials, such as graphite, carbon fiber, metals, plastics, fabrics, mesh, other flexible and/or expandable materials, other materials, or combinations thereof, and may be of any size and/or shape. In addition, the propeller blade 104 may include a flexible and/or expandable bladder 1140-1 that may be actuated to expand and/or retract the expandable propeller blade 104. The bladder 1140-1 may comprise a bag, container, or other vessel, and may be formed of flexible and expandable materials, such as plastics, rubbers, silicone, or other flexible materials.

The expandable propeller blade 104 may be modified between two or more configurations or positions via the movable joint. In a first configuration in which the expandable propeller blade 104 is not expanded or modified, e.g., a normal operation or low torque configuration as illustrated in FIG. 11B, the expandable propeller blade 104 may have a first shape, size, cross-section, or other parameters. In the first configuration, the expandable propeller blade 104 may not generate or produce any additional torque due to drag or air resistance during operation of the propeller blade 104. In a second configuration in which the expandable propeller blade 104 is expanded or modified, e.g., a drag operation or high torque configuration as illustrated in FIG. 11C, the expandable propeller blade 104 may be expanded or modified via the movable joint to a desired second shape, size, cross-section, or other parameters. In the second configuration, the expandable propeller blade 104 may generate or produce additional torque due to drag or air resistance during operation of the propeller blade 104, which additional torque may be initiated, controlled, and/or modified to facilitate, improve, or increase controllability of an aerial vehicle.

In addition, a plurality of sections or portions of the expandable propeller blade 104 may be selectively and/or independently controlled between two or more configurations or positions via one or more bladders 1140, although only one bladder 1140-1 is illustrated in FIGS. 11A-11C. In this manner, the additional torque generated or produced due to drag or air resistance may be tuned, controlled, and/or modified based at least in part on the respective configurations of each of the plurality of sections and their respective shapes, sizes, cross-sections, or other parameters. For example, expanding a bladder and associated section of the propeller blade via a movable joint near a tip of the propeller blade 104 may generate greater additional torque than expanding a bladder and associated section of the propeller blade via a movable joint near a root of the propeller blade 104. In addition, expanding two or more expandable bladders and associated sections of the propeller blade via movable joints may generate greater additional torque than expanding only one of a plurality of expandable bladders and an associated section of the propeller blade via a movable joint.

One or more actuators may be associated with the one or more sections of the expandable propeller blade 104, and may be operable to expand and/or retract the one or more sections via movable joints. Each of the actuators may be connected via electrical lines or wirelessly (not shown) to an aerial vehicle control system, a part thereof, or another component in communication with the aerial vehicle control system, in order to receive power and/or instructions or commands.

The one or more actuators may include one or more of a pneumatic actuator, a hydraulic actuator, a gas or fluid discharge element, an expanding material such as expanding foam, or various other types of actuators that may deliver and/or modify gas or fluid pressure associated with the one or more sections of the expandable propeller blade 104. In addition, the one or more actuators may be configured for one-time actuation, e.g., upon detection of a propulsion mechanism failure or other aerial vehicle fault or failure, may be configured for one-way or two-way actuation, may be configured for binary actuation between two different positions, and/or may be configured for variable actuation between a plurality of different positions. In example embodiments comprising actuators configured for one-time actuation, various manual repair, replacement, or other intervention may be performed following expansion and/or retraction of one or more sections of the expandable propeller blade 104.

In one example embodiment, the one or more actuators may comprise a pneumatic actuator and/or hydraulic actuator that expands and/or retracts one or more bladders 1140 associated with respective sections of an expandable propeller blade 104 between two or more configurations via gas or fluid pressure that causes modification of the movable joints. As described herein, the one or more bladders 1140 may comprise bags, containers, or other vessels, and may be formed of flexible and expandable materials, such as plastics, rubbers, silicone, or other flexible materials.

In another example embodiment, the one or more actuators may comprise a gas or fluid discharge element, e.g., a carbon dioxide cartridge or other gas cartridge, that may release gas or fluid into one or more bladders 1140 associated with respective sections of an expandable propeller blade 104 to modify the sections between two or more configurations via modification of the movable joints. In a further example embodiment, the one or more actuators may comprise an expanding material, e.g., expandable foam, two-part expandable form, multi-part expandable foam, various other types of one- or multi-part expanding materials, or various other chemical reactions that may release gas or fluids, that may expand into one or more bladders 1140 associated with respective sections of an expandable propeller blade 104 to modify the sections between two or more configurations via modification of the movable joints. In other example embodiments, each section of an expandable propeller blade 104 and associated bladder 1140 may be associated with a respective actuator, e.g., pneumatic or hydraulic actuator, gas cartridge, or expanding material, to provide independent actuation of each section of an expandable propeller blade 104 via modification of associated movable joints. In further example embodiments utilizing gas or fluid pressure, centripetal acceleration due to rotation of a propeller blade may be leveraged to cause gas or fluid to expand one or more bladders, in which case a pneumatic or hydraulic actuator may be optional.

In still further example embodiments, in place of or in addition to one or more bladders 1140 and associated actuators, the one or more actuators may further comprise motors, springs, solenoids, servos, linear actuators, or other types of actuators that may expand and/or retract one or more sections of an expandable propeller blade via modification of the movable joints. For example, a compressed spring may be released, a solenoid may be extended, and/or other actuators may be actuated to physically push, pull, stretch, expand, retract, or otherwise modify one or more sections of an expandable propeller blade via modification of the movable joints.

Although FIGS. 11A-11C illustrate particular numbers, shapes, sizes, positions, orientations, and/or expanded shapes or sizes associated with blade sections, in other example embodiments, different numbers, shapes, sizes, positions, orientations, and/or expanded shapes or sizes may be associated with one or more blade sections of an expandable propeller blade. For example, one or more sections may have other shapes or sizes. In addition, one or more sections may be positioned or oriented at various locations on the underside, upper side, trailing edge, leading edge, or other surfaces or edges of the propeller blade, e.g., near the tip, near the root, or various other locations. Further, one or more sections may be configured to expand to different shapes and/or sizes, e.g., 1 mm, 2 mm, curved surface, angular surface, or other shapes or sizes, relative to a remainder of the propeller blade. Moreover, the movable joints of the expandable propeller blade may be formed and/or shaped differently from a slip joint or sliding joint, while still maintaining the expanding and/or retracting capability of the propeller blade or sections thereof. Furthermore, although only two configurations or positions are shown in FIGS. 11A-11C, one or more sections of an expandable propeller blade may be expanded and/or retracted between three or more different configurations or positions via modification of movable joints.

Figure 12:
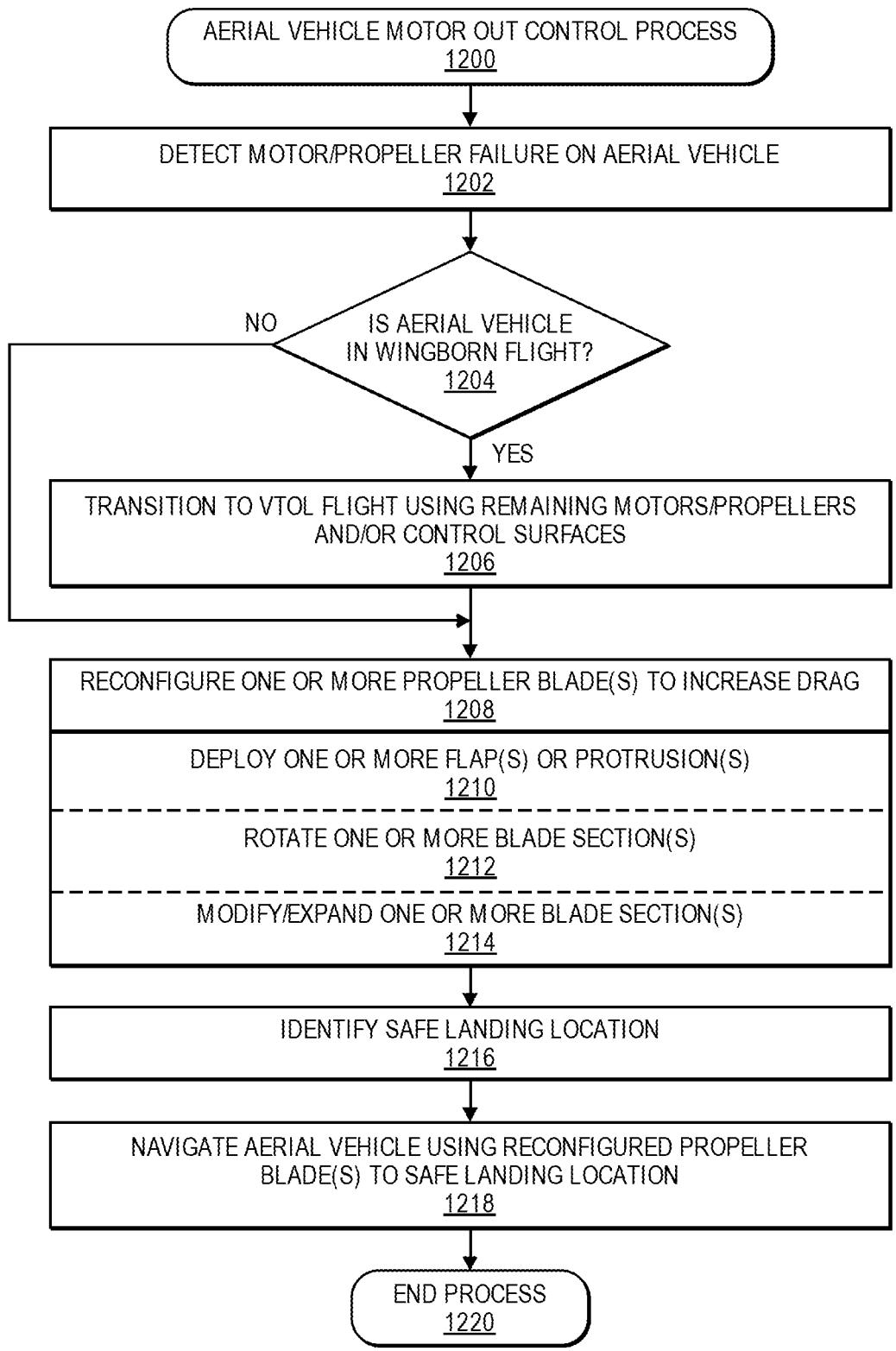
FIG. 12 is a flow diagram illustrating an example aerial vehicle motor out control process, in accordance with disclosed implementations.

FIG. 12 is a flow diagram illustrating an example aerial vehicle motor out control process 1200, in accordance with disclosed implementations.

The process 1200 may begin by detecting a motor/propeller failure on an aerial vehicle, as at 1202. For example, the motor/propeller failure may be a propulsion mechanism failure. In addition, the detected failure may be any of the various types of faults that may result in motor out situations, as described herein. In some example embodiments, a failure may be detected by one or more sensors and/or may be processed by one or more processors or controllers. In other example embodiments, a failure may be inherently or implicitly detected, e.g., without use of any sensors, processors, and/or controllers, such that reconfigurations of one or more modifiable sections of one or more propeller blades may be substantially automatically initiated or effected responsive to the failure. For example, an electrical circuit or power distribution system may be designed such that a change in power, voltage, or current associated with a propulsion mechanism, which may be indicative of a failure, may substantially automatically trigger or effect a reconfiguration of a modifiable section of a propeller blade.

The process 1200 may continue by determining whether the aerial vehicle is currently in wingborn flight, as at 1204. For example, wingborn flight may be synonymous with navigation of the aerial vehicle in a substantially horizontal direction, as described with reference to FIGS. 1 and 3-5. This may be determined based on data associated with the flight controller and/or one or more motor controllers. In addition, this may be determined based on a flight plan of the aerial vehicle. Further, this may be determined based on data associated with one or more sensors, such as an inertial measurement unit, accelerometers, and/or gyroscopes.

If it is determined that the aerial vehicle is currently in wingborn flight, as at 1204, then the process 1200 may proceed to transition the aerial vehicle from wingborn flight to VTOL flight using any control surfaces and/or any remaining propulsion mechanisms, as at 1206. As described herein, the aerial vehicle may transition from wingborn flight to VTOL flight by reducing pitch and/or speed of the aerial vehicle such that the ring wing produces less lift and the aerial vehicle pitches rearward to a VTOL flight orientation, as described with respect to FIG. 2. In addition, upon detecting the failure associated with the aerial vehicle, one or more of the remaining propulsion mechanisms may modify their respective toe angles, e.g., angles relative to a center of mass or center of gravity of the aerial vehicle. For example, one or more of the remaining propulsion mechanisms may be modified to be angled toward the fuselage of the aerial vehicle, which may generally be described as a toe-in angle.

After transitioning to VTOL flight, as at 1206, or after determining that the aerial vehicle is not currently in wingborn flight, as at 1204, the process 1200 may continue by reconfiguring one or more propeller blades to increase drag, as at 1208. As described herein, the drag or air resistance experienced by a propeller blade may be modified to alter a force-torque ratio of the propeller blade. Various aspects of one or more propeller blades may be altered to modify the force-torque ratio of a propeller blade, including deploying one or more flaps or protrusions from an underside of the propeller blade, as at 1210, rotating one or more blade sections of the propeller blade, as at 1212, and/or modifying and/or expanding one or more blade sections of the propeller blade, as at 1214. One or more of the described modifications or reconfigurations may be effected on one or more propeller blades for one or more propulsion mechanisms to increase the torque generated by the one or more propeller blades based at least in part on increased drag or air resistance during operation of the propeller blades. In this manner, the increased torque may function as a source of additional torque that can be tuned, managed, and/or controlled in order to improve or increase controllability of an aerial vehicle, even in degraded operational states such as motor out situations.

In some example embodiments, all propeller blades may be configured to and be capable of modifying their force-torque ratios, and/or all propeller blades for all propulsion mechanisms may be modified to change their force-torque ratios. In other example embodiments, a subset of all propeller blades for all propulsion mechanisms may be modified to change their force-torque ratios. For example, if a first propulsion mechanism of a hex-copter experiences a fault or failure, one or more propeller blades of a second propulsion mechanism that is situated across or opposite the aerial vehicle from the first propulsion mechanism may be modified to generate additional torque. Moreover, the force-torque ratios of one or more propellers may be dynamically tuned or modified to generate a desired amount of torque by selective and/or independent actuation of one or more modifications to propellers.

Generally, it may be desirable to avoid altering or modifying the force, lift, or thrust generated by a propeller blade when modifying or reconfiguring the propeller blade to provide additional torque. In some example embodiments, however, force, lift, or thrust generated by a propeller blade may also be modified, e.g., increased or decreased, when modifying or reconfiguring the propeller blade to provide additional torque. In such scenarios, other propeller blades and/or propulsion mechanisms, as well as various other parameters of the aerial vehicle, may consequently also be modified to compensate for any changes to force, lift, or thrust generated by a propeller blade that has been reconfigured to generate additional torque due to drag or air resistance.

Moreover, although the process 1200 is described generally as reconfiguring one or more propeller blades after an aerial vehicle has transitioned to VTOL flight orientation, in other example embodiments, one or more propeller blades may be reconfigured substantially immediately or responsive to detecting a failure, without regard to a current flight orientation of the aerial vehicle. In further example embodiments, one or more propeller blades may be reconfigured prior to or during transitioning to VTOL flight orientation such that the additional torque generated by the one or more reconfigured propeller blades may be utilized to assist the transition from horizontal to VTOL flight orientation. Furthermore, as described herein, one or more propeller blades may be reconfigured even in the absence of any detected failures, such as during normal flight or other operational states of aerial vehicles, to improve or increase controllability of the aerial vehicles.

After reconfiguring one or more propeller blades to increase drag, as at 1208, the process 1200 may proceed by identifying a safe landing location, as at 1216. For example, the safe landing location may be predetermined and stored by or provided to the aerial vehicle. Various safe landing locations may be identified and stored beforehand, and the aerial vehicle may identify a closest available safe landing location responsive to the motor out situation. In other examples, the aerial vehicle may use one or more sensors, such as imaging devices, radar, LIDAR, proximity sensors, inertial measurement units, navigation sensors such as global positioning sensors, and/or other types of sensors, to identify a safe landing location responsive to the motor out situation. Various other types of sensors, beacons, or communication devices may also be used to identify a safe landing location for the aerial vehicle.

The process 1200 may then continue to control the aerial vehicle using the reconfigured one or more propeller blades to the safe landing location, as at 1218. For example, the aerial vehicle may reconfigure one or more propeller blades to modify their force-torque ratios responsive to changes in drag or air resistance, and the aerial vehicle may navigate to the identified safe landing location using the reconfigured one or more propeller blades, as well as based on data from one or more sensors, such as imaging devices and navigation sensors. Upon landing or reaching the safe landing location, the one or more reconfigured propeller blades may be reversed, e.g., from a drag operation or high torque configuration to a normal operation or low torque configuration. In example embodiments comprising two-way actuators, the actuators may cause reversal of the reconfigurations applied to the one or more propeller blades. In example embodiments comprising one-way or one-time actuators, manual repair, replacement, or intervention may be required to reverse the reconfigurations applied to the one or more propeller blades. In further example embodiments utilizing gas or fluid pressure that leverages centripetal acceleration due to rotation of a propeller blade, causing slowing or stopping of the propeller blade, and thereby reducing centripetal acceleration, may substantially automatically cause reversal of the reconfigurations applied to the one or more propeller blades. The process 1200 may then end, as at 1220.

Figure 13:
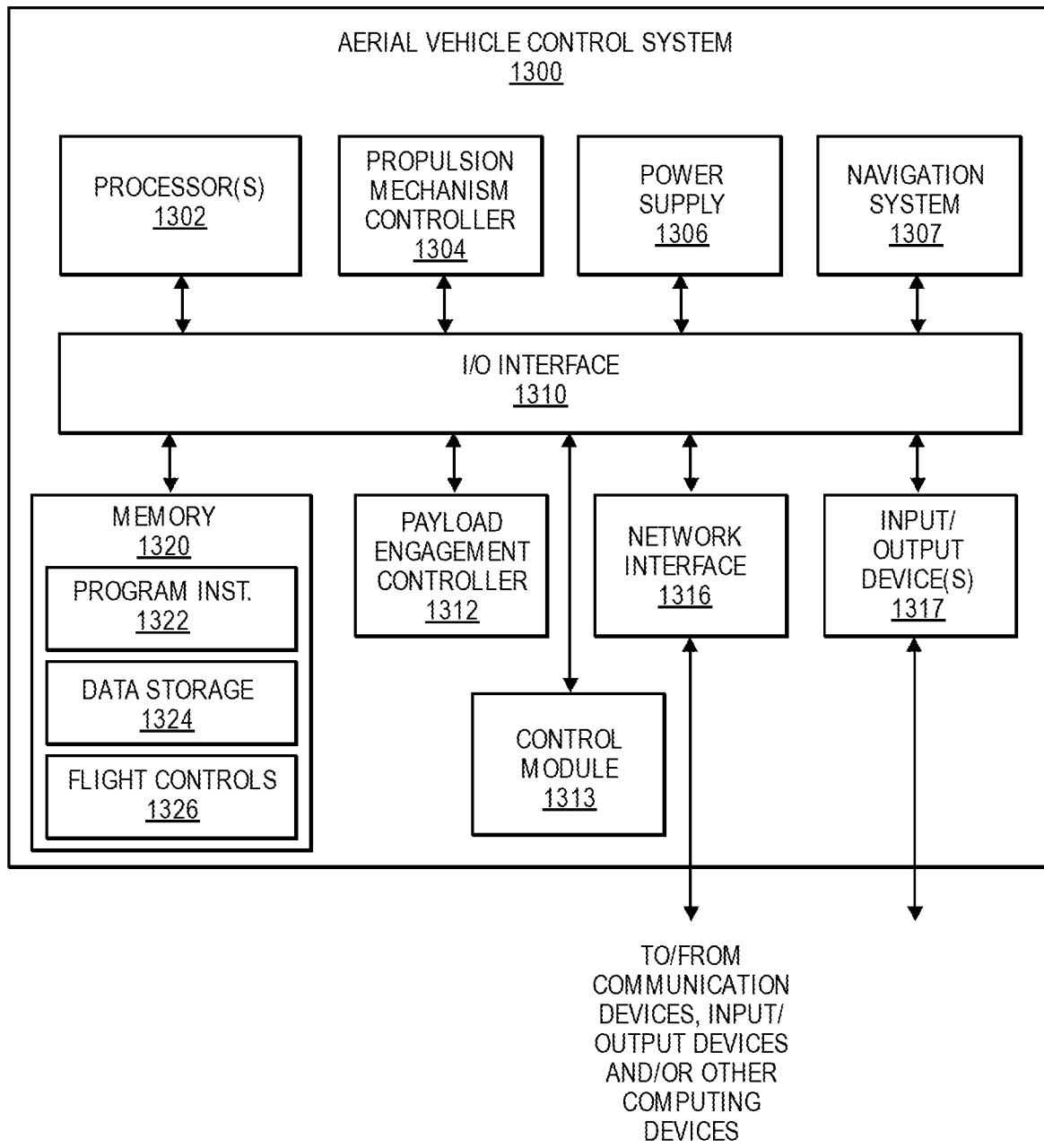
FIG. 13 is a block diagram illustrating various components of an example aerial vehicle control system, in accordance with disclosed implementations.

FIG. 13 is a block diagram illustrating various components of an example aerial vehicle control system 1300, in accordance with disclosed implementations.

In various examples, the block diagram may be illustrative of one or more aspects of the aerial vehicle control system 1300 that may be used to implement the various systems and methods discussed herein and/or to control operation of an aerial vehicle discussed herein. In the illustrated implementation, the aerial vehicle control system 1300 includes one or more processors 1302, coupled to a memory, e.g., a non-transitory computer readable storage medium 1320, via an input/output (I/O) interface 1310. The aerial vehicle control system 1300 also includes propulsion mechanism controllers 1304, such as electronic speed controls (ESCs) or motor controllers, power modules 1306 and/or a navigation system 1307. The aerial vehicle control system 1300 further includes a payload engagement controller 1312, a control module 1313 configured to implement one or more aerial vehicle reconfigurations described herein, a network interface 1316, and one or more input/output devices 1317.

In various implementations, the aerial vehicle control system 1300 may be a uniprocessor system including one processor 1302, or a multiprocessor system including several processors 1302 (e.g., two, four, eight, or another suitable number). The processor(s) 1302 may be any suitable processor capable of executing instructions. For example, in various implementations, the processor(s) 1302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1302 may commonly, but not necessarily, implement the same ISA.

The non-transitory computer readable storage medium 1320 may be configured to store executable instructions, data, flight paths, flight control parameters, center of gravity information, and/or data items accessible by the processor(s) 1302. In various implementations, the non-transitory computer readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1320 as program instructions 1322, data storage 1324 and flight controls 1326, respectively. In other implementations, program instructions, data, and/or flight controls may be received, sent, or stored upon different types of computer-accessible media, such as non-transitory media, or on similar media separate from the non-transitory computer readable storage medium 1320 or the aerial vehicle control system 1300. Generally speaking, a non-transitory, computer readable storage medium may include storage media or memory media such as magnetic or optical media, e.g., disk or CD/DVD-ROM, coupled to the aerial vehicle control system 1300 via the I/O interface 1310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1316.

In one implementation, the I/O interface 1310 may be configured to coordinate I/O traffic between the processor(s) 1302, the non-transitory computer readable storage medium 1320, and any peripheral devices, the network interface or other peripheral interfaces, such as input/output devices 1317. In some implementations, the I/O interface 1310 may perform any necessary protocol, timing or other data transformations to convert data signals from one component (e.g., non-transitory computer readable storage medium 1320) into a format suitable for use by another component (e.g., processor(s) 1302). In some implementations, the I/O interface 1310 may include support for devices attached through various types of peripheral buses, such as a variant of the Peripheral Component Interconnect (PCI) bus standard or the Universal Serial Bus (USB) standard, for example. In some implementations, the function of the I/O interface 1310 may be split into two or more separate components, such as a north bridge and a south bridge, for example. Also, in some implementations, some or all of the functionality of the I/O interface 1310, such as an interface to the non-transitory computer readable storage medium 1320, may be incorporated directly into the processor(s) 1302.

The propulsion mechanism controllers 1304 may communicate with the navigation system 1307 and adjust the rotational speed, position, orientation, or other parameters of each propulsion mechanism to implement one or more aerial vehicle reconfigurations, to stabilize the aerial vehicle, and/or to perform one or more maneuvers and guide the aerial vehicle along a flight path and/or to a safe landing location.

The navigation system 1307 may include a global positioning system (GPS), indoor positioning system (IPS), or other similar system and/or sensors that can be used to navigate the aerial vehicle to and/or from a location. The payload engagement controller 1312 communicates with the actuator(s) or motor(s) (e.g., a servo motor) used to engage and/or disengage items.

The control module 1313 may comprise or form a part of a flight controller that is configured to implement one or more aerial vehicle reconfigurations described herein related to modifying force-torque ratios of one or more propeller blades, such as deploying or extending one or more flaps or protrusions, rotating one or more blade sections, and/or modifying or expanding one or more blade sections, or other reconfigurations of propeller blades and/or blade sections of the aerial vehicle. Further, the control module 1313 may also be configured to control wingborn or horizontal flight of the aerial vehicle, VTOL flight of the aerial vehicle, and transitions between wingborn and VTOL flight orientations of the aerial vehicle. The control module 1313 may send and/or receive data to/from one or more sensors, such as imaging devices, an inertial measurement unit, accelerometers, gyroscopes, navigation sensors, or other sensors, and/or the control module 1313 may send and/or receive data to/from propulsion mechanism controllers 1304 associated with respective propulsion mechanisms. In some example embodiments, the control module 1313 may be integrated with or form a part of one or more of the processors 1302, the propulsion mechanism controllers 1304, and/or the navigation system 1307.

The network interface 1316 may be configured to allow data to be exchanged between the aerial vehicle control system 1300, other devices attached to a network, such as other computer systems (e.g., remote computing resources), and/or with aerial vehicle control systems of other aerial vehicles. For example, the network interface 1316 may enable wireless communication between the aerial vehicle and an aerial vehicle control system that is implemented on one or more remote computing resources. For wireless communication, an antenna of the aerial vehicle or other communication components may be utilized. As another example, the network interface 1316 may enable wireless communication between numerous aerial vehicles. In various implementations, the network interface 1316 may support communication via wireless general data networks, such as a Wi-Fi network. For example, the network interface 1316 may support communication via telecommunications networks, such as cellular communication networks, satellite networks, and the like.

Input/output devices 1317 may, in some implementations, include one or more displays, imaging devices, thermal sensors, infrared sensors, time of flight sensors, accelerometers, pressure sensors, weather sensors, etc. Multiple input/output devices 1317 may be present and controlled by the aerial vehicle control system 1300. One or more of these sensors may be utilized to implement the aerial vehicle reconfigurations described herein, as well as to detect failures or faults, control wingborn or VTOL flight, effect transitions between wingborn and VTOL configurations, identify safe landing locations, and/or any other operations or functions described herein.

As shown in FIG. 13, the memory may include program instructions 1322, which may be configured to implement the example routines and/or sub-routines described herein. The data storage 1324 may include various data stores for maintaining data items that may be provided for aerial vehicle reconfigurations, determining flight paths, landing, identifying locations for disengaging items, determining which propulsion mechanisms to utilize to execute a maneuver, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1300 is merely illustrative and is not intended to limit the scope of the present disclosure. In particular, the computing system and devices may include any combination of hardware or software that can perform the indicated functions. The aerial vehicle control system 1300 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1300. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1300 may be transmitted to the aerial vehicle control system 1300 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. A propeller, comprising:
    at least one propeller blade coupled to and rotated by a motor;
    at least one modifiable section associated with at least one surface or edge of the at least one propeller blade;
    wherein the at least one modifiable section is configured to adjust the at least one propeller blade between a first configuration and a second configuration;
    wherein the first configuration is associated with a first torque and the second configuration is associated with a second torque that is different from the first torque; and
    wherein the first configuration is associated with normal operation of an aerial vehicle comprising the propeller, and the second configuration is associated with degraded operation of the aerial vehicle comprising the propeller.

2. The propeller of claim 1, wherein the at least one modifiable section comprises at least one flap configured to be deployed from the at least one surface or edge of the at least one propeller blade.

3. The propeller of claim 2, wherein the at least one flap comprises a hinge configured to pivot the at least one flap relative to the at least one surface or edge of the at least one propeller blade.

4. The propeller of claim 1, wherein the at least one modifiable section comprises at least one protrusion configured to be extended from the at least one surface or edge of the propeller blade.

5. The propeller of claim 1, wherein the at least one modifiable section comprises a rotatable section of the propeller blade.

6. The propeller of claim 1, wherein the at least one modifiable section comprises at least one expandable section on the at least one surface or edge of the propeller blade.

7. The propeller of claim 6, wherein the at least one modifiable section comprises at least one of a flexible material or a movable joint.

8. The propeller of claim 6, wherein the at least one expandable section is associated with at least one expandable bladder within the propeller blade.

9. The propeller of claim 1, wherein the normal operation of the aerial vehicle comprising the propeller comprises a fully operational state of propulsion mechanisms of the aerial vehicle, and the degraded operation of the aerial vehicle comprising the propeller comprises a degraded operational state of at least one propulsion mechanism of the aerial vehicle.

10. The propeller of claim 1, further comprising:
    at least one actuator configured to actuate the at least one modifiable section between the first configuration and the second configuration.

11. The propeller of claim 10, wherein the at least one actuator is configured to actuate the at least one modifiable section from the first configuration to the second configuration in response to detecting the degraded operation of the aerial vehicle.

12. The propeller of claim 10, wherein the at least one actuator comprises at least one of a clutch, a switch, a bias element, a servo, a solenoid, a motor, a screw actuator, a geared actuator, a magnetic actuator, a linear actuator, a rotary actuator, a piezoelectric actuator, a pneumatic actuator, or a hydraulic actuator.

\* \* \* \* \*